US012665640B2

(12) United States Patent
Hao et al.

(10) Patent No.: US 12,665,640 B2
(45) Date of Patent: Jun. 23, 2026

(54) CHANNEL STATE INFORMATION REPORTING FOR PARTIAL BANDS

(71) Applicant: QUALCOMM INCORPORATED, San Diego, CA (US)

(72) Inventors: Chenxi Hao, Beijing (CN); Yu Zhang, San Diego, CA (US); Hao Xu, Beijing (CN); Liangming Wu, Beijing (CN); Kangqi Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 613 days.

(21) Appl. No.: 17/916,781

(22) PCT Filed: May 11, 2020

(86) PCT No.: PCT/CN2020/089602
§ 371 (c)(1),
(2) Date: Oct. 3, 2022

(87) PCT Pub. No.: WO2021/226789
PCT Pub. Date: Nov. 18, 2021

(65) Prior Publication Data
US 2023/0155653 A1     May 18, 2023

(51) Int. Cl.
H04B 7/06 (2006.01)
H04L 5/00 (2006.01)
(Continued)

(52) U.S. Cl.
CPC ......... H04B 7/0626 (2013.01); H04L 5/0048 (2013.01); H04W 24/10 (2013.01); H04W 72/04 (2013.01)

(58) Field of Classification Search
CPC .... H04B 7/0626; H04L 5/0048; H04W 24/10; H04W 72/04
See application file for complete search history.

(56) References Cited

U.S. PATENT DOCUMENTS 11,265,900 B2     3/2022   Hao et al.
2018/0227094 A1*  8/2018   Liu .................... H04B 7/06966
(Continued)

FOREIGN PATENT DOCUMENTS

WO          2020038154 A1     2/2020
WO       WO-2020091663 A1     5/2020
(Continued)

OTHER PUBLICATIONS

Ericsson: "On CSI Enhancements for MU-MIMO", 3GPP Draft, 3GPP TSG RAN WG1 Meeting RAN1#97, R1-1907074, On CSI Enhancements for MU-MIMO, 3rd Generation Partnership Project (3GPP), Mobile Competence Centre, 650 Route Des Lucioles, F-06921 Sophia-Antipolis Cedex, France, vol. RAN WG1, No. Reno, US, May 13, 2019-May 17, 2019, May 13, 2019 (May 13, 2019), XP051728520, 19 Pages, section 1-3.
(Continued)

*Primary Examiner* — Ricky Q Ngo
*Assistant Examiner* — Stephen N Steiner
(74) *Attorney, Agent, or Firm* — QUALCOMM Incorporated

(57) ABSTRACT

Methods, systems, and devices for wireless communications are described. A user equipment (UE) may receive a configuration message from a base station, and the configuration message may include an indication of one or more partial bands for channel state information reporting. Each partial band of the one or more partial bands may be less than a system bandwidth and include a plurality of frequency domain units associated with a precoder. The UE may select one or more antenna ports for each partial band of the one or more partial bands based on the configuration message and calculate channel state information including a linear combination of the selected one or more antenna ports for each partial band. The UE may transmit the channel state
(Continued)

information including an indication of the selected antenna ports and linear combination coefficients for each partial band of the one or more partial bands.

35 Claims, 16 Drawing Sheets

(51) Int. Cl.

| | |
|---|---|
| *H04W 24/10* | (2009.01) |
| *H04W 72/04* | (2023.01) |

(56) References Cited

U.S. PATENT DOCUMENTS

| | | | |
|---|---|---|---|
| 2019/0053089 A1 | 2/2019 | Kwak et al. | |
| 2019/0190673 A1* | 6/2019 | Kwak | H04B 7/0417 |
| 2019/0260448 A1 | 8/2019 | Rahman et al. | |
| 2022/0006499 A1* | 1/2022 | Wernersson | H04B 7/0478 |

FOREIGN PATENT DOCUMENTS

| | | |
|---|---|---|
| WO | WO-2020091665 A1 | 5/2020 |
| WO | WO-2020091671 A1 | 5/2020 |

OTHER PUBLICATIONS

International Search Report and Written Opinion—PCT/CN2020/089602—ISA/EPO—Feb. 9, 2021.

Samsung: "Summary of CSI Enhancement for MU-MIMO Support", 3GPP TSG RAN WG1 Meeting #95, R1-1813002, 3rd Generation Partnership Project, Mobile Competence Centre, 650, Route Des Lucioles, F-06921 Sophia-Antipolis Cedex, France, vol. RAN WG1, Nov. 12, 2018-Nov. 16, 2018, Nov. 15, 2018, 9 Pages, XP051494308, Section 2.1.

* cited by examiner

Partial Band <u>305-a</u>

|  | FD unit <u>320-a</u>  0 | FD unit <u>320-b</u>  1 |  | FD unit <u>320-c</u>  $\frac{N_3}{2} - 1$ |
|---|---|---|---|---|
| Port <u>310-a</u> | $b_0 * f_0^H[0]$ | $b_0 * f_0^H[1]$ | $\cdots$ | $b_0 * f_0^H[\frac{N_3}{2} - 1]$ |
| Port <u>310-b</u> | $b_0 * f_1^H[0]$ | $b_0 * f_1^H[1]$ | $\cdots$ | $b_0 * f_1^H[\frac{N_3}{2} - 1]$ |
| Port <u>310-c</u> | $b_1 * f_0^H[0]$ | $b_1 * f_0^H[1]$ | $\cdots$ | $b_1 * f_0^H[\frac{N_3}{2} - 1]$ |
| Port <u>310-d</u> | $b_1 * f_1^H[0]$ | $b_1 * f_1^H[1]$ | $\cdots$ | $b_1 * f_1^H[\frac{N_3}{2} - 1]$ |

Partial Band <u>305-b</u>

|  | FD unit <u>320-d</u>  $\frac{N_3}{2}$ | FD unit <u>320-e</u>  $\frac{N_3}{2} + 1$ |  | FD unit <u>320-f</u>  $N_3 - 1$ |
|---|---|---|---|---|
| Port <u>315-a</u> | $b_0 * f_0^H[0]$ | $b_0 * f_0^H[1]$ | $\cdots$ | $b_0 * f_0^H[\frac{N_3}{2} - 1]$ |
| Port <u>315-b</u> | $b_0 * f_1^H[0]$ | $b_0 * f_1^H[1]$ | $\cdots$ | $b_0 * f_1^H[\frac{N_3}{2} - 1]$ |
| Port <u>315-c</u> | $b_1 * f_0^H[0]$ | $b_1 * f_0^H[1]$ | $\cdots$ | $b_1 * f_0^H[\frac{N_3}{2} - 1]$ |
| Port <u>315-d</u> | $b_1 * f_1^H[0]$ | $b_1 * f_1^H[1]$ | $\cdots$ | $b_1 * f_1^H[\frac{N_3}{2} - 1]$ |

FIG. 3

$\diagdown$ — 300

115-B

105-B

405  Configuration Message

410  Select Antenna Ports

415  Reference Signal

420  Calculate Channel State Information

425  Channel State Information

400

Receiver

510

Channel State Information Manager

515

Transmitter

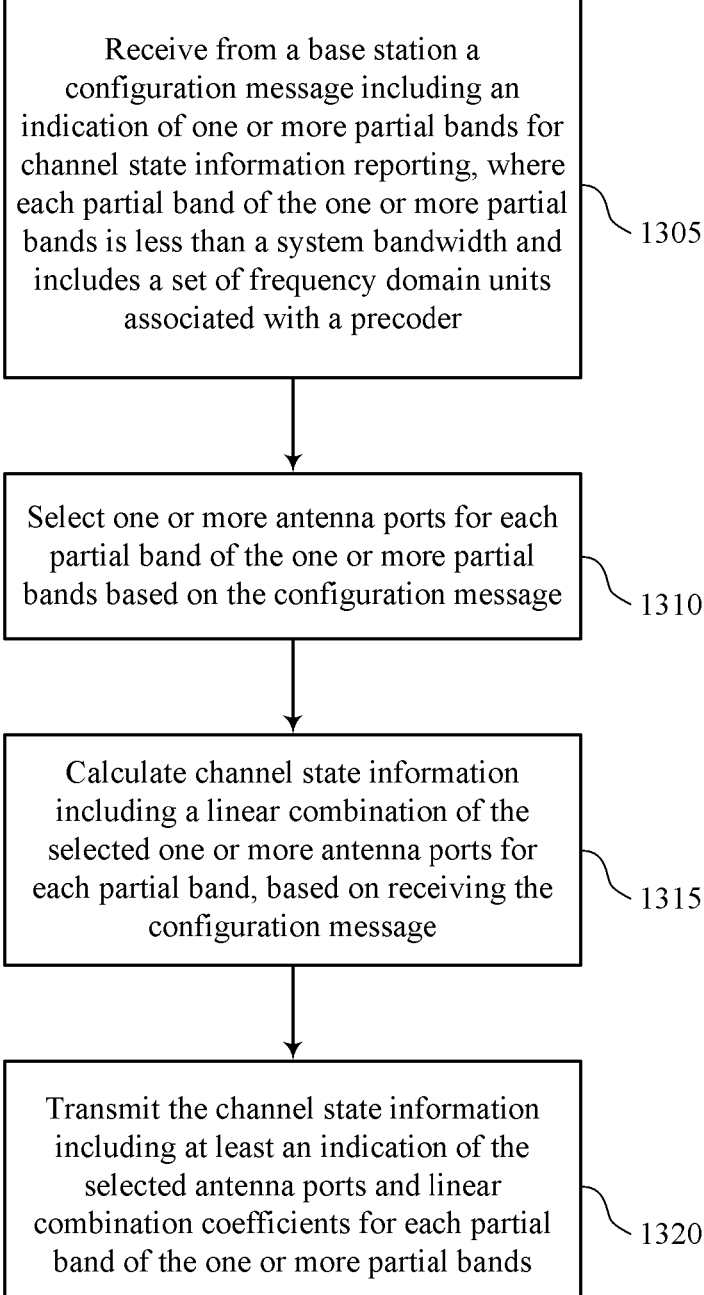

Receive from a base station a configuration message including an indication of one or more partial bands for channel state information reporting, where each partial band of the one or more partial bands is less than a system bandwidth and includes a set of frequency domain units associated with a precoder

1305

Select one or more antenna ports for each partial band of the one or more partial bands based on the configuration message

1310

Calculate channel state information including a linear combination of the selected one or more antenna ports for each partial band, based on receiving the configuration message

1315

Transmit the channel state information including at least an indication of the selected antenna ports and linear combination coefficients for each partial band of the one or more partial bands

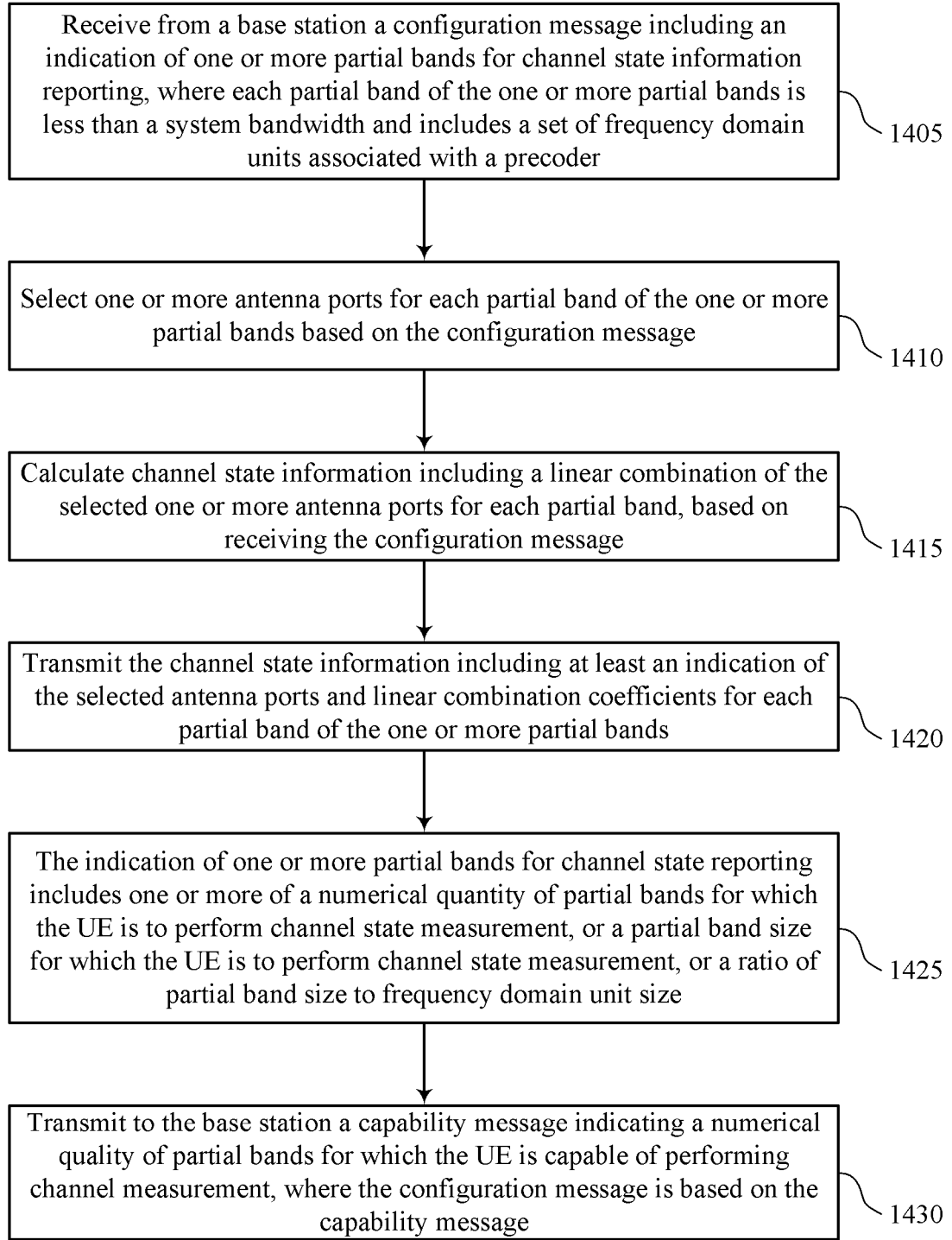

Receive from a base station a configuration message including an indication of one or more partial bands for channel state information reporting, where each partial band of the one or more partial bands is less than a system bandwidth and includes a set of frequency domain units associated with a precoder

1405

Select one or more antenna ports for each partial band of the one or more partial bands based on the configuration message

1410

Calculate channel state information including a linear combination of the selected one or more antenna ports for each partial band, based on receiving the configuration message

1415

Transmit the channel state information including at least an indication of the selected antenna ports and linear combination coefficients for each partial band of the one or more partial bands

1420

The indication of one or more partial bands for channel state reporting includes one or more of a numerical quantity of partial bands for which the UE is to perform channel state measurement, or a partial band size for which the UE is to perform channel state measurement, or a ratio of partial band size to frequency domain unit size

1425

Transmit to the base station a capability message indicating a numerical quality of partial bands for which the UE is capable of performing channel measurement, where the configuration message is based on the capability message

Figure 15:
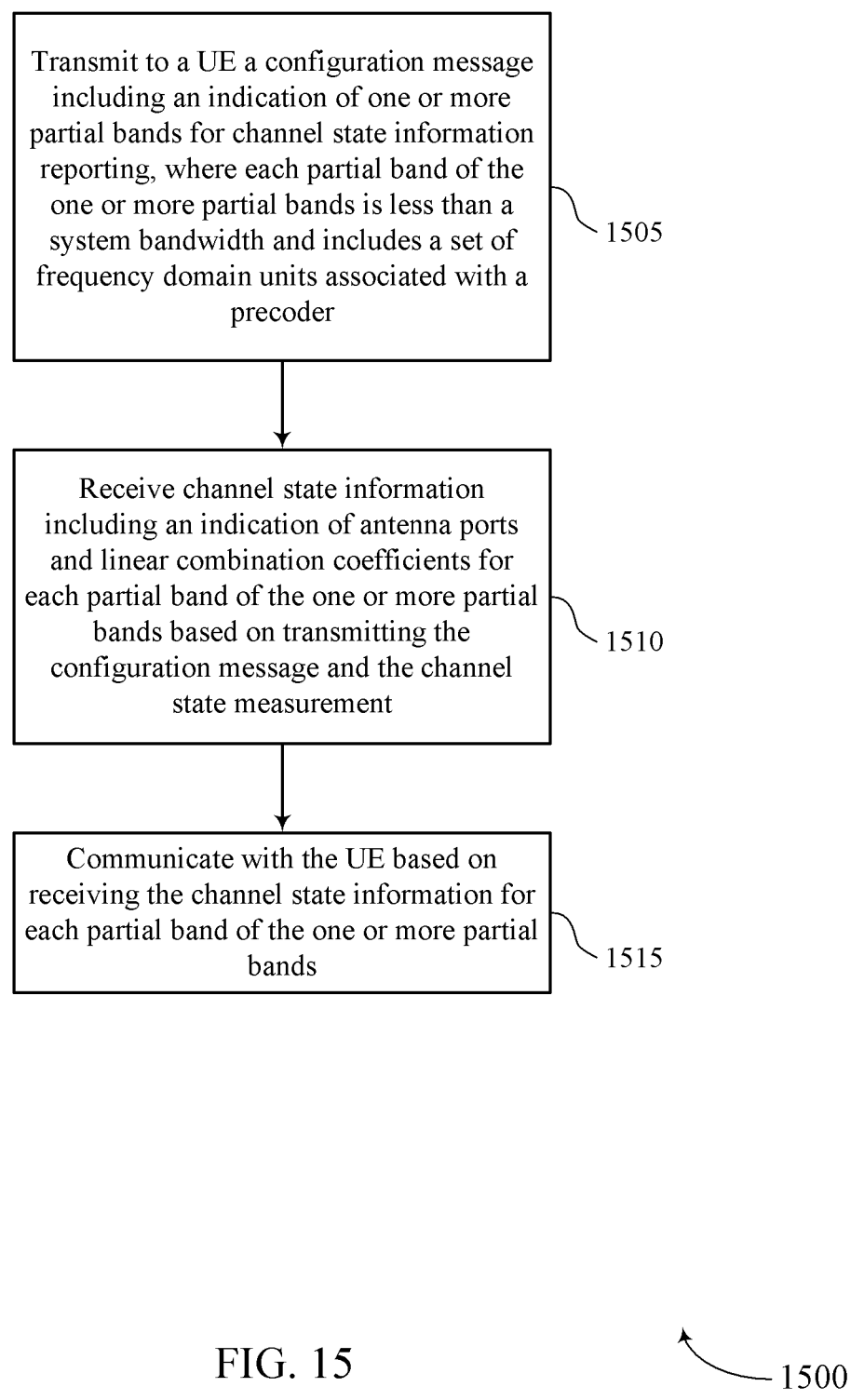

Transmit to a UE a configuration message including an indication of one or more partial bands for channel state information reporting, where each partial band of the one or more partial bands is less than a system bandwidth and includes a set of frequency domain units associated with a precoder

1505

↓

Receive channel state information including an indication of antenna ports and linear combination coefficients for each partial band of the one or more partial bands based on transmitting the configuration message and the channel state measurement

1510

↓

Communicate with the UE based on receiving the channel state information for each partial band of the one or more partial bands

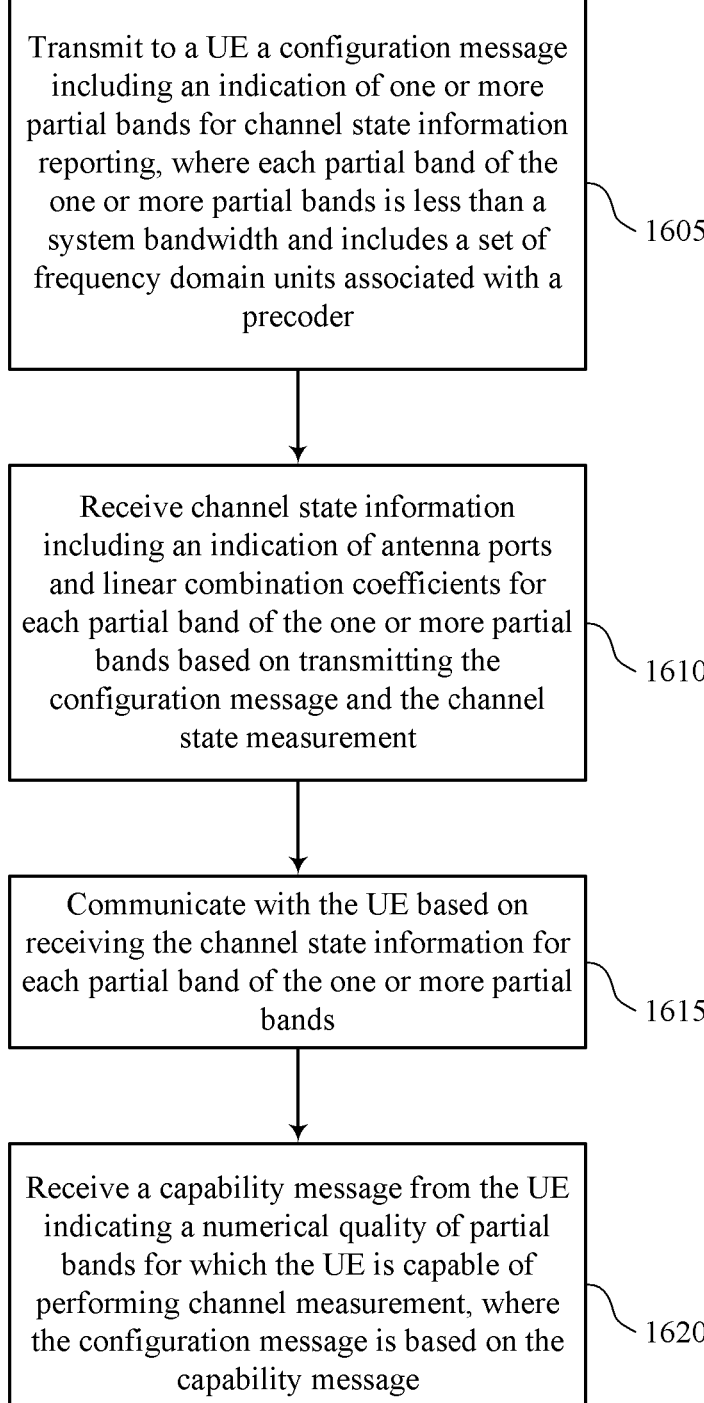

Transmit to a UE a configuration message including an indication of one or more partial bands for channel state information reporting, where each partial band of the one or more partial bands is less than a system bandwidth and includes a set of frequency domain units associated with a precoder

1605

Receive channel state information including an indication of antenna ports and linear combination coefficients for each partial band of the one or more partial bands based on transmitting the configuration message and the channel state measurement

1610

Communicate with the UE based on receiving the channel state information for each partial band of the one or more partial bands

1615

Receive a capability message from the UE indicating a numerical quality of partial bands for which the UE is capable of performing channel measurement, where the configuration message is based on the capability message

CHANNEL STATE INFORMATION REPORTING FOR PARTIAL BANDS

CROSS REFERENCE

The present application is a 371 national stage filing of International PCT Application No. PCT/CN2020/089602 by HAO et al. entitled "CHANNEL STATE INFORMATION REPORTING FOR PARTIAL BANDS," filed May 11, 2020, which is assigned to the assignee hereof, and which is expressly incorporated by reference in its entirety herein.

FIELD OF TECHNOLOGY

The following relates generally to wireless communications and more specifically to channel state information reporting for partial bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A base station may configure a UE for uplink or downlink communications. However, the base station may configure the UE poorly based on feedback that is reported by the UE.

SUMMARY

The described techniques relate to improved methods, systems, devices, and apparatuses that support channel state information reporting for partial bands. Generally, the described techniques provide for improving the granularity and quality of channel state information (CSI). For example, a user equipment (UE) may provide CSI to a base station on a per-partial band basis, and the base station may configure the UE based on the CSI.

A UE may receive a configuration message from a base station, and the configuration message may include an indication of one or more partial bands for CSI reporting. Each partial band of the one or more partial bands may be less than a system bandwidth and include a plurality of frequency domain units (e.g., subbands, resource blocks, etc.) associated with a precoder. The UE may select one or more antenna ports (e.g., CSI reference signal (CSI-RS) ports) for each partial band of the one or more partial bands based on the configuration message. For example, the configuration message may indicate a group of antenna ports, a number of antenna ports, a minimum number of antenna ports, or a maximum number of antenna ports, and the UE may select the one or more antenna ports based on the configuration message. The UE may calculate CSI including a linear combination of the selected one or more antenna ports for each partial band. The CSI may be calculated based on receiving the configuration message, and the UE may transmit the CSI to a base station. The CSI may include an indication of the selected antenna ports and linear combination coefficients for each partial band of the one or more partial bands.

A method of wireless communication at a UE is described. The method may include receiving from a base station a configuration message including an indication of one or more partial bands for channel state information reporting, where each partial band of the one or more partial bands is less than a system bandwidth and includes a set of frequency domain units associated with a precoder, selecting one or more antenna ports for each partial band of the one or more partial bands based on the configuration message, calculating channel state information including a linear combination of the selected one or more antenna ports for each partial band, based on receiving the configuration message, and transmitting the channel state information including at least an indication of the selected antenna ports and linear combination coefficients for each partial band of the one or more partial bands.

An apparatus for wireless communication at a UE is described. The apparatus may include a processor, memory coupled with the processor, and instructions stored in the memory. The instructions may be executable by the processor to cause the apparatus to receive from a base station a configuration message including an indication of one or more partial bands for channel state information reporting, where each partial band of the one or more partial bands is less than a system bandwidth and includes a set of frequency domain units associated with a precoder, select one or more antenna ports for each partial band of the one or more partial bands based on the configuration message, calculate channel state information including a linear combination of the selected one or more antenna ports for each partial band, based on receiving the configuration message, and transmit the channel state information including at least an indication of the selected antenna ports and linear combination coefficients for each partial band of the one or more partial bands.

Another apparatus for wireless communication at a UE is described. The apparatus may include means for receiving from a base station a configuration message including an indication of one or more partial bands for channel state information reporting, where each partial band of the one or more partial bands is less than a system bandwidth and includes a set of frequency domain units associated with a precoder, selecting one or more antenna ports for each partial band of the one or more partial bands based on the configuration message, calculating channel state information including a linear combination of the selected one or more antenna ports for each partial band, based on receiving the configuration message, and transmitting the channel state information including at least an indication of the selected antenna ports and linear combination coefficients for each partial band of the one or more partial bands.

A non-transitory computer-readable medium storing code for wireless communication at a UE is described. The code may include instructions executable by a processor to receive from a base station a configuration message including an indication of one or more partial bands for channel state information reporting, where each partial band of the one or more partial bands is less than a system bandwidth and includes a set of frequency domain units associated with a precoder, select one or more antenna ports for each partial band of the one or more partial bands based on the configuration message, calculate channel state information including a linear combination of the selected one or more antenna ports for each partial band, based on receiving the configuration message, and transmit the channel state information including at least an indication of the selected antenna ports and linear combination coefficients for each partial band of the one or more partial bands.

In some examples of the method, apparatuses, and non-transitory computer-readable medium described herein, selecting the one or more antenna ports may include operations, features, means, or instructions for selecting a subset of a total number of antenna ports for each partial band of the one or more partial bands.

In some examples of the method, apparatuses, and non-transitory computer-readable medium described herein, a same subset of one or more CSI-RS ports may be selected for each partial band of the one or more partial bands.

Some examples of the method, apparatuses, and non-transitory computer-readable medium described herein may further include operations, features, means, or instructions for calculating the channel state information includes separately precoding each partial band of the one or more partial bands.

In some examples of the method, apparatuses, and non-transitory computer-readable medium described herein, the indication of one or more partial bands for channel state reporting includes one or more of a numerical quantity of partial bands for which the UE may be to perform channel state measurement, or a partial band size for which the UE may be to perform channel state measurement, or a ratio of partial band size to frequency domain unit size.

Some examples of the method, apparatuses, and non-transitory computer-readable medium described herein may further include operations, features, means, or instructions for transmitting to the base station a capability message indicating a numerical quality of partial bands for which the UE may be capable of performing channel measurement, where the configuration message may be based on the capability message.

In some examples of the method, apparatuses, and non-transitory computer-readable medium described herein, the indication of one or more partial bands may be dependent on an indication of a numerical quantity of antenna ports to select for each partial band of the one or more partial bands, or a numerical quantity of total antenna ports, and selecting the one or more antenna ports for each partial band may be based on the indicated numerical quantity.

In some examples of the method, apparatuses, and non-transitory computer-readable medium described herein, the antenna ports include channel state information reference signal (CSI-RS) ports and the configuration message further includes a joint indication of partial bands and a numerical quantity of the CSI-RS ports, and selecting the one or more antenna ports for each partial band may be based on the joint indication.

In some examples of the method, apparatuses, and non-transitory computer-readable medium described herein, the joint indication may include operations, features, means, or instructions for a number of partial bands, a partial band size, or a ratio of partial bands to frequency unit size; and one or more of: a number of total CSI-RS ports or a number of CSI-RS ports to be selected for each partial band.

Some examples of the method, apparatuses, and non-transitory computer-readable medium described herein may further include operations, features, means, or instructions for transmitting to the base station a report of the one or more antenna ports selected for each partial band of the one or more partial bands, where the report of the one or more antenna ports selected for each partial band includes an indication of a first set of antenna ports common to all partial bands of the one or more partial bands and, for each partial band of the one or more partial bands, an indication of a second set of antenna ports independently selected for that partial band, where the second set of antenna ports for each partial band may be from the first set of antenna ports.

Some examples of the method, apparatuses, and non-transitory computer-readable medium described herein may further include operations, features, means, or instructions for receiving from the base station a configuration of a size of the first set of antenna ports and a size of the second set of antenna ports.

Some examples of the method, apparatuses, and non-transitory computer-readable medium described herein may further include operations, features, means, or instructions for transmitting to the base station a report of a resource selection for the channel state measurement for each partial band of the one or more partial bands.

Some examples of the method, apparatuses, and non-transitory computer-readable medium described herein may further include operations, features, means, or instructions for receiving, from the base station, a configuration of frequency domain restriction for channel measurement, and determining that a frequency domain restriction for channel measurement may be in place based on the configuration of frequency domain restriction for channel measurement, where calculating the channel information for each partial band of the one or more partial bands includes restricting the channel state measurement to non-zero power channel state information reference signals within each partial band.

Some examples of the method, apparatuses, and non-transitory computer-readable medium described herein may further include operations, features, means, or instructions for receiving, from the base station, a configuration of frequency domain restriction for interference measurement, and determining that a frequency domain restriction for interference measurement may be in place based on the configuration of frequency domain restriction for channel measurement, where performing interference measurement for each partial band of the one or more partial bands includes restricting the interference measurement to zero or non-zero interference measurement resources within each partial band.

In some examples of the method, apparatuses, and non-transitory computer-readable medium described herein, a frequency domain unit of the set of frequency domain units corresponds to a subband size for channel quality indicator (CQI) reporting.

A method of wireless communication at a base station including is described. The method may include transmitting to a UE a configuration message including an indication of one or more partial bands for channel state information reporting, where each partial band of the one or more partial bands is less than a system bandwidth and includes a set of frequency domain units associated with a precoder, receiving channel state information including an indication of antenna ports and linear combination coefficients for each partial band of the one or more partial bands based on transmitting the configuration message and the channel state measurement, and communicating with the UE based on receiving the channel state information for each partial band of the one or more partial bands.

An apparatus for wireless communication at a base station including is described. The apparatus may include a processor, memory coupled with the processor, and instructions stored in the memory. The instructions may be executable by the processor to cause the apparatus to transmit to a UE a configuration message including an indication of one or more partial bands for channel state information reporting, where each partial band of the one or more partial bands is less than a system bandwidth and includes a set of frequency domain units associated with a precoder, receive channel state information including an indication of antenna ports and linear combination coefficients for each partial band of the one or more partial bands based on transmitting the configuration message and the channel state measurement, and communicate with the UE based on receiving the channel state information for each partial band of the one or more partial bands.

Another apparatus for wireless communication at a base station including is described. The apparatus may include means for transmitting to a UE a configuration message including an indication of one or more partial bands for channel state information reporting, where each partial band of the one or more partial bands is less than a system bandwidth and includes a set of frequency domain units associated with a precoder, receiving channel state information including an indication of antenna ports and linear combination coefficients for each partial band of the one or more partial bands based on transmitting the configuration message and the channel state measurement, and communicating with the UE based on receiving the channel state information for each partial band of the one or more partial bands.

A non-transitory computer-readable medium storing code for wireless communication at a base station including is described. The code may include instructions executable by a processor to transmit to a UE a configuration message including an indication of one or more partial bands for channel state information reporting, where each partial band of the one or more partial bands is less than a system bandwidth and includes a set of frequency domain units associated with a precoder, receive channel state information including an indication of antenna ports and linear combination coefficients for each partial band of the one or more partial bands based on transmitting the configuration message and the channel state measurement, and communicate with the UE based on receiving the channel state information for each partial band of the one or more partial bands.

In some examples of the method, apparatuses, and non-transitory computer-readable medium described herein, the indication of one or more partial bands for channel state reporting includes one or more of a numerical quantity of partial bands for which the UE may be to perform channel state measurement, or a partial band size for which the UE may be to perform channel state measurement, or a ratio of partial band size to frequency domain unit size.

In some examples of the method, apparatuses, and non-transitory computer-readable medium described herein, the indication of one or more partial bands may be dependent on an indication of a numerical quantity of antenna ports to select for each partial band of the one or more partial bands, or a numerical quantity of total antenna ports, and selecting the one or more antenna ports for each partial band may be based on the indicated numerical quantity.

Some examples of the method, apparatuses, and non-transitory computer-readable medium described herein may further include operations, features, means, or instructions for receiving a capability message from the UE indicating a numerical quality of partial bands for which the UE may be capable of performing channel measurement, where the configuration message may be based on the capability message.

In some examples of the method, apparatuses, and non-transitory computer-readable medium described herein, the antenna ports include channel state information reference signal (CSI-RS) ports and the configuration message further includes a joint indication of partial bands and a numerical quantity of the CSI-RS ports, and the one or more antenna ports for each partial band may be selected based on the join indication.

In some examples of the method, apparatuses, and non-transitory computer-readable medium described herein, the joint indication may include operations, features, means, or instructions for a number of partial bands, a partial band size, or a ratio of partial bands to frequency unit size; and one or more of: a number of total CSI-RS ports or a number of CSI-RS ports to be selected for each partial band.

Some examples of the method, apparatuses, and non-transitory computer-readable medium described herein may further include operations, features, means, or instructions for receiving a report from the UE of one or more antenna ports selected for each partial band of the one or more partial bands, where the report of the one or more antenna ports selected for each partial band includes an indication of a first set of antenna ports common to all partial bands of the one or more partial bands and, for each partial band of the one or more partial bands, an indication of a second set of antenna ports independently selected for that partial band, where the second set of antenna ports for each partial band may be from the first set of antenna ports.

Some examples of the method, apparatuses, and non-transitory computer-readable medium described herein may further include operations, features, means, or instructions for transmitting to the UE a configuration of a size of the first set of antenna ports and a size of the second set of antenna ports.

Some examples of the method, apparatuses, and non-transitory computer-readable medium described herein may further include operations, features, means, or instructions for receiving from the UE a report of a resource selection for the channel state measurement for each partial band of the one or more partial bands.

Some examples of the method, apparatuses, and non-transitory computer-readable medium described herein may further include operations, features, means, or instructions for transmitting, to the UE, a configuration of frequency domain restriction for channel measurement, and receiving the channel state information based on channel measurement of non-zero power channel state information reference signals within each partial band.

Some examples of the method, apparatuses, and non-transitory computer-readable medium described herein may further include operations, features, means, or instructions for transmitting, to the UE, a configuration of frequency domain restriction for interference measurement, and receiving the channel state information based on interference measurement of interference measurement resources within each partial band.

BRIEF DESCRIPTION OF THE DRAWINGS

FIG. 3 illustrates an example of a channel state information reporting technique that supports channel state information reporting for partial bands in accordance with aspects of the present disclosure.

FIGS. 13 through 16 show flowcharts illustrating methods that support channel state information reporting for partial bands in accordance with aspects of the present disclosure.

DETAILED DESCRIPTION

Figure 1:
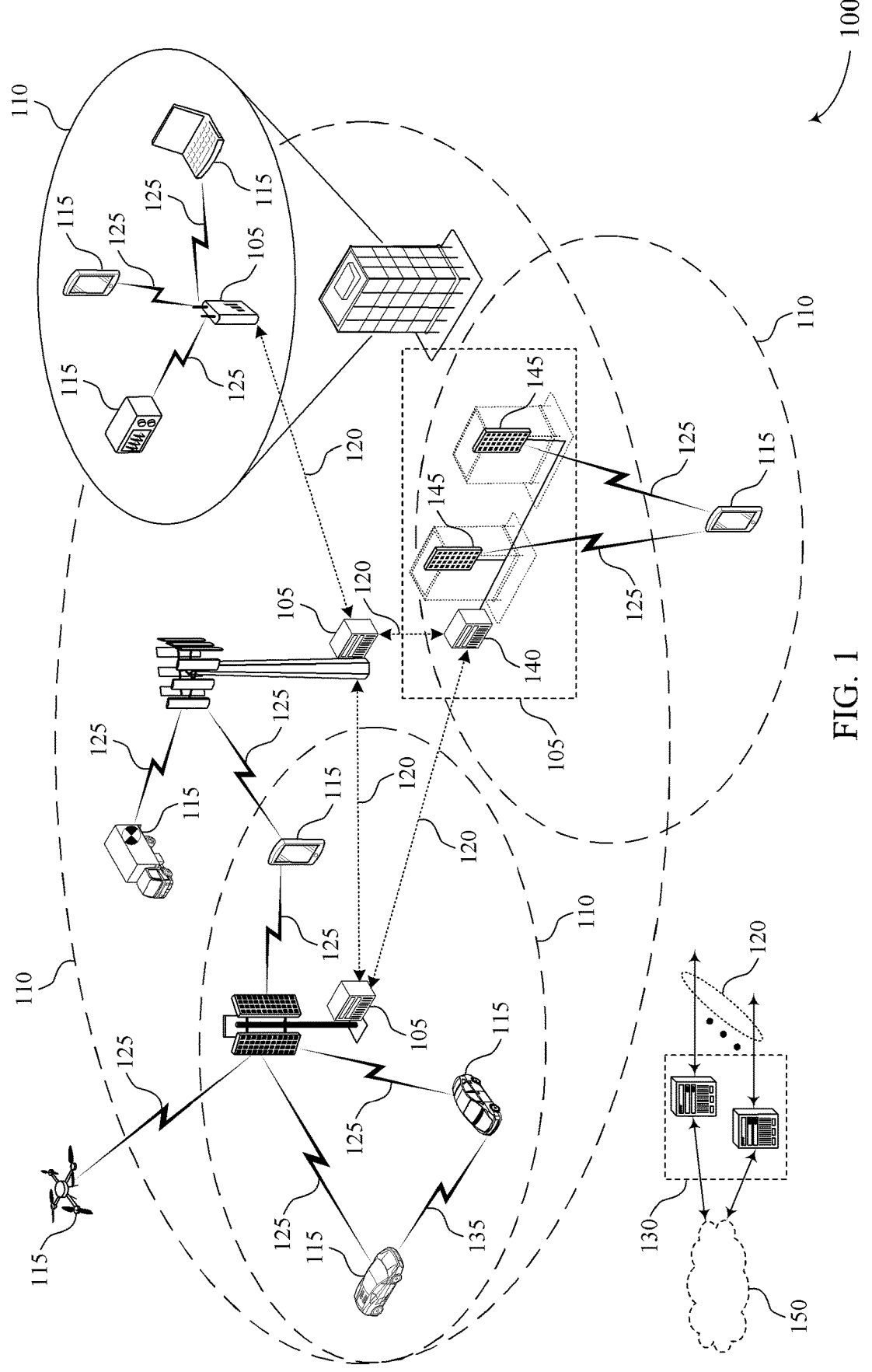
FIG. 1 illustrates an example of a system for wireless communications that supports channel state information reporting for partial bands in accordance with aspects of the present disclosure.

Wireless communications systems are widely deployed to provide various types of communication content such as voice, video, packet data, messaging, broadcast, and so on. These systems may support a user equipment (UE) receiving a channel state information reference signal (CSI-RS), measuring the CSI-RS transmission, and sending channel information (e.g., channel state information, a CSI report, etc.) to the base station. In some cases, the CSI-RS may be precoded, and the precoding of the CSI-RS may be based on spatial and delay reciprocity between uplink and downlink channels, but portions of the system bandwidth used to transmit the CSI-RS may have poor spatial and delay reciprocity across the uplink and downlink channels. In some cases, providing a channel report for the system bandwidth with poor spatial reciprocity may lower the quality of the channel as indicated in the channel report. A base station may set a low modulation and coding scheme (MCS) for the system bandwidth based on the low channel quality indicated in the channel report, which may negatively affect throughput between the UE and the base station.

In some cases, a UE may receive a CSI-RS with frequency selective precoding. The precoded CSI-RS may be received across all FD units (e.g., FD unit 0, FD unit 1, . . . . FD $N_3-1$), as shown in table 1. The precoder of a CSI-RS port may be formed by a pair of a spatial domain (SD) basis (e.g., an SD transmission filter) and an FD basis (e.g., FD transmission filter/weight). The UE may calculate CSI based on an observation for a port "p" on FD unit "n". For example, the UE may observe $$\hat{H}_p[n] = H b_{i(p)} f_{m(p)}^H[n]$$

for port "p" on FD unit "n", where "H" is the wireless channel between the UE and a base station without precoding. For each layer, the UE may select a subset of total ports and report a single coefficient per port across the frequency band. In some cases, the UE may report CSI for all FD units as a linear combination of the selected ports. The precoding matrix indicator (PMI) for a certain layer l on any of the $N_3$ FD units may be expressed by $$W_l = \Sigma_{k=0}^{k_0-1} v_{i_{k(l)}} * c_{k,l}$$

where $v_{i_{k(l)}}$ is the size of P×1 with only one "1" in row $i_k$ indicating port $i_{k(l)}$ is selected for layer l, P is the total number of CSI-RS ports, and $c_{k,l}$ is a linear combination coefficient. In some cases, the UE may calculate a channel quality indicator (CQI) using a virtual physical downlink shared channel (PDSCH) as expressed by $$\begin{bmatrix} y^{3000} \\ \dots \\ y^{3000+P-1} \end{bmatrix} = W \begin{bmatrix} x^0 \\ \dots \\ x^{(v-1)} \end{bmatrix},$$

and the actual precoder of the virtual PDSCH may be expressed by $$\left[ b_{i(3000)} f_{m(3000)}^H, \dots, b_{i(3000+P-1)} f_{m(3000+P-1)}^H \right] \times$$

$$\left[ \Sigma_{k=0}^{k_0-1} v_{i_{k(0)}} * c_{k,0}, \dots, \Sigma_{k=0}^{k_0-1} v_{i_{k(v-1)}} * c_{k,v-1} \right],$$

as illustrated in Table 1.

TABLE 1

| | FD Unit 0 | FD Unit 1 | | FD Unit $N_3 - 1$ |
|---|---|---|---|---|
| Port 3000 | $b_0 * f_0^H[0]$ | $b_0 * f_0^H[1]$ | $\cdots$ | $b_0 * f_0^H[N_3 - 1]$ |
| Port 3001 | $b_0 * f_1^H[0]$ | $b_0 * f_1^H[1]$ | $\cdots$ | $b_0 * f_1^H[N_3 - 1]$ |
| Port 3002 | $b_1 * f_0^H[0]$ | $b_1 * f_0^H[1]$ | $\cdots$ | $b_1 * f_0^H[N_3 - 1]$ |
| Port 3003 | $b_1 * f_1^H[0]$ | $b_1 * f_1^H[1]$ | $\cdots$ | $b_1 * f_1^H[N_3 - 1]$ |

According to aspects described herein, a UE may provide channel information for a number of partial bands associated with a system bandwidth. In some cases, a base station may configure the UE with a set of partial bands for which the UE is to provide channel information (e.g., CSI). The UE may use the set of partial bands to measure a reference signal (e.g., a CSI-RS) transmitted by the base station and provide channel information on a per-partial band basis by transmitting CSI coefficients for each partial band to the base station. In some additional or alternative cases, the base station may configure a set of antenna ports (e.g., CSI-RS ports) for the UE to use in measuring the reference signal (e.g., a CSI-RS) for each partial band. Reporting channel information (e.g., CSI) on a per-partial band basis and/or a number of antenna ports may increase the granularity of the channel information and allow the base station to determine different channel conditions for different partial bands. The base station may use the increased granularity of the channel information to configure the UE, thereby improving system efficiency.

In some cases, the base station may configure the UE with a number of partial bands, and the UE may report channel information for the number of partial bands. A partial band width may be smaller than a system bandwidth width and larger than a subband (e.g., frequency domain unit, resource block, etc.) width. The base station may additionally or alternatively configure the UE with a number of ports that may be selected for use in measuring channel information. The base station may configure the UE by transmitting a pair of numbers to the UE, and the pair of number may indicate port and subband information for use in measuring channel information. For example, a first number in the pair of numbers may indicate a CSI-RS port or a number of CSI-RS ports the UE may select, and a second number in the pair of numbers may indicate a number of partial bands. The UE may select a number of CSI-RS ports for each partial band, calculate CSI based on the partial band and/or port information, and transmit the calculated CSI containing linear combination coefficients for each partial band to the base station.

The UE may receive a configuration message from a base station, and the configuration message may include an indication of one or more partial bands for CSI reporting. The width of each partial band of the one or more partial bands may be less than the width of a system bandwidth and include a plurality of frequency domain units (e.g., subbands, resource blocks, etc.). The UE may select one or more antenna ports (e.g., CSI-RS ports) for each partial band based on the configuration message and receive a reference signal (e.g., a CSI-RS) at the one or more antenna ports. The UE may calculate CSI that includes a linear combination of the selected one or more antenna ports for each partial band. In some cases, the CSI may be calculated based on receiving the configuration message. The UE may transmit the CSI to a base station, and the CSI may include an indication of the selected antenna ports and linear combination coefficients for each partial band of the one or more partial bands.

Aspects of the disclosure are initially described in the context of wireless communications systems. Aspects of the disclosure are also described with respect to an additional wireless communications system, a channel state information reporting technique, and a process flow. Aspects of the disclosure are further illustrated by and described with reference to apparatus diagrams, system diagrams, and flowcharts that relate to channel state information reporting for partial bands.

FIG. 1 illustrates an example of a wireless communications system 100 that supports channel state information reporting for partial bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-todevice (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to some aspects, a UE 115 may support reporting CSI on a per-partial band basis. The UE 115 may receive a configuration message that indicates one or more partial bands and select one or more antenna ports (e.g., CSI-RS ports) for each partial band of the one or more partial bands. The UE 115 may receive a reference signal (e.g., a CSI-RS) at the selected one or more antenna ports, calculate CSI that includes a linear combination of the selected one or more antenna ports for each partial band, and transmit the CSI to a base station 105. The CSI may include an indication of the selected antenna ports and linear combination coefficients for each partial band of the one or more partial bands. Reporting CSI on a per-partial band basis may improve the quality of the CSI as well as a data transmission rate between the UE 115 and the base station 105.

Figure 2:
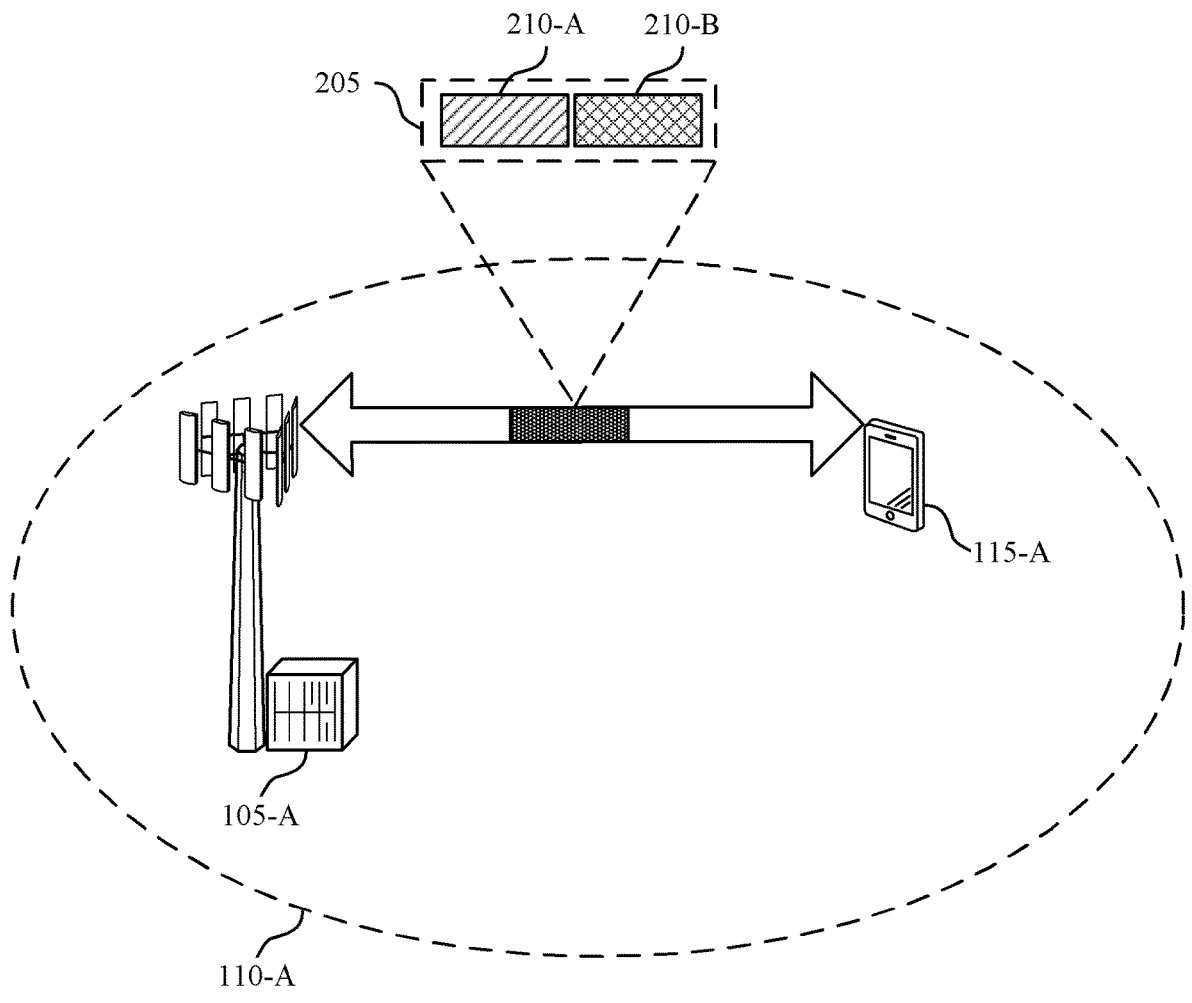
FIG. 2 illustrates an example of a wireless communications system that supports channel state information reporting for partial bands in accordance with aspects of the present disclosure.

FIG. 2 illustrates an example of a wireless communications system 200 that supports channel state information reporting for partial bands in accordance with aspects of the present disclosure. In some examples, wireless communications system 200 may implement aspects of wireless communication system 100, as described with reference to FIG. 1. The wireless communications system 200 includes base station 105-a and UE 115-a. Generally, the wireless communication system 200 illustrates an example where UE 115-a transmits a CSI 205 to base station 105-a, and the CSI 205 may include partial band CSI 210-a and/or partial band CSI 210-b.

In some cases, a base station may transmit a precoded CSI-RS to a UE over a system bandwidth based on spatial and delay reciprocity, and the UE may transmit a CSI report to the base station based on receiving the precoded CSI-RS. A mismatch between uplink and downlink bands may be associated with poor spatial and delay reciprocity and impact the channel information included in the CSI report. For example, a BS may determine a spatial domain basis and frequency domain basis used for the precoding of CSI-RS based on UL channel estimation. If there is poor spatial and delay reciprocity between uplink and downlink channel, the determined SD/FD basis using uplink channel is different compared to the dominant SD/FD basis in the downlink channel. If a UE reports CSI based on CSI-RS precoding with SD/FD bases biased from the dominant SD/FD basis of downlink channel, the channel information included in the CSI report would have lower quality. UE 115-a may transmit a CSI 205 to base station 105-a, and the CSI 205 may include one or more partial band CSIs 210. Transmitting one or more partial band CSIs to base station 105-a may support base station 105-a in determining different channel conditions for the different partial bands instead of assuming a uniform set of channel conditions for the entire system bandwidth. In some cases, base station 105-a may determine different data transmission configurations (e.g., MCSs) for the different portions of the system bandwidth, thereby improving system efficiency and data throughput.

UE 115-a may transmit a sounding reference signal (SRS) to base station 105-a, and base station 105-a may transmit a CSI-RS to UE 115-a based on receiving the SRS received from UE 105-a. UE 115-a may receive the CSI-RS from base station 105-a, identify one or more partial bands, determine one or more partial band CSIs 210 corresponding to the one or more partial bands, and transmit the one or more partial band CSIs 210 to base station 105-a. The width of the partial bands may be smaller than the width of the system bandwidth and larger than the width of a subband (e.g., frequency domain unit). In some cases, UE 115-a may select a subset of total antenna ports (e.g., CSI-RS ports) for each partial band. UE 115-a may select the same subset of total antenna ports for different partial bands for each layer or across all layers, different subsets of total antenna ports for different partial bands for each layer or across all layers, or any combination thereof. As noted above, in some cases the antenna ports may be CSI-RS ports.

In some cases, base station 105-a may configure UE 115-a with a number of CSI-RS ports or a number of CSI-RS ports UE 115-a may select. Base station 105-a may additionally or alternatively configure UE 115-a with a number of partial bands. For example, base station 105-a may configure UE 115-a by transmitting a message that includes a pair of numbers (e.g., {32 1}, {24, 1}, {16 1}, {16 2}, {12 1}, {12 2}, {12 3}, {8 1}, {8 2}, {8 3}, {8 4}, etc.). One of the numbers in the pair (e.g., the first number) may correspond to a number of CSI-RS ports or a number of CSI-RS ports UE 115-a is allowed to select (for each layer or across all layers), and another number in the pair (e.g., the second number) may correspond to the number of partial bands. The configuration may be subject to the capability or preference of UE 115-a. In some examples, UE 115-a may signal to base station 105-a a partial band capability and/or a port capability, and base station 105-a may configure UE 115-a based on the signaled capability. For example, UE 115-a may signal a partial band capability of 1 to base station 105-a, and base station 105-a may configure the UE based on the signaled capability (e.g., base station 105-a may configure UE 115-a with one of {32 1}, {24, 1}, {16 1}, or {12 1}). In an additional or alternative example, UE 115-a may signal a port capability of 8 to base station 105-a, and base station 105-a may configure the UE based on the signaled capability (e.g., base station 105-a may configure UE 115-a with one of {8 1}, {8 2}, {8 3}, or {8 4}). In an additional or alternative example, UE 115-a may signal a max partial band capability of 2 to base station 105-a, and base station 105-a may configure the UE based on the signaled capability (e.g., base station 105-a may configure UE 115-a with one of {32 1}, {24, 1}, {16 1}, {12 1}, {16 2}, {12 2}, {8 2}).

In some cases, base station 105-a may configure UE 115-a with a number of ports or a number of ports the UE is allowed to select for each layer or across all layers, as well as a partial band size. For example, base station 105-a may configure UE 115-a by transmitting a message that includes a pair of numbers (e.g., {32 ⅛}, {24, ⅛}, {16 ⅛}, {16 ¼}, {12 ⅛}, {12 ¼}, {12 ½}, {8 ⅛}, {8 ¼}, {8 ½}, {8 1}, etc.). One of the numbers (e.g., the first number) may correspond to the number of ports or the number of ports the UE is allowed to select for each layer or across all layers, and the second number may correspond to the number of partial bands per subband (e.g., less than or equal to 1 partial bands per subband) or the ratio between the size of the subband and the size of the partial band. Base station 105-*a* may configure 115-*a* based on a capability of UE 115-*a*. In some examples, UE 115-*a* may signal to base station 105-*a* a subband capability, and base station 105-*a* may configure UE 115-*a* based on the signaled capability. For example, UE 115-*a* may signal a capability of 8 subbands per partial band to base station 105-*a*, and base station 105-*a* may configure UE 115-*a* based on the signaled capability (e.g., base station 105-*a* may configure UE 115-*a* with one or {32 ⅛}, {24, ⅛}, {16 ⅛}, {12 ⅛}, {8 ⅛}). In an additional or alternative example, UE 115-*a* may signal a max partial band capability of minimum 4 subbands per partial band to base station 105-*a*, and base station 105-*a* may configure the UE based on the signaled capability (e.g., base station 105-*a* may configure UE 115-*a* with one of {32 ⅛}, {24, ⅛}, {16 ⅛}, {12 ⅛}, {8 ⅛}, {16 ¼}, {12 ¼}, {8 ¼}).

The partial band size (e.g., the number of subbands in a partial band) may be based on a number of subbands and a number of partial bands. In some examples, UE 115-*a* may be configured with a number of subbands (e.g., 13 subbands) and base station 105-*a* may further configure UE 115-*a* with a number of partial bands (e.g., 2 partial bands). For example, the first partial band may have a size of 6 subbands and the second partial band may have a size of 7 subbands. In some cases, UE 115-*a* may be configured with a large number of ports and a small number of partial bands. In some additional or alternative cases, UE 115-*a* may be configured with a small number of ports and either a large or small number of partial bands. Configuring UE 115-*a* with a large number of partial bands may support increase the granularity and/or quality of CSI 205, and configuring UE 115-*a* with a small number of partial bands may decrease the payload size of CSI 205, thereby reducing system resource usage.

FIG. 3 illustrates an example of a channel state information reporting technique 300 that supports channel state information reporting for partial bands in accordance with aspects of the present disclosure. In some examples, channel state information reporting technique 300 may implement aspects of wireless communication system 100, as described with reference to FIG. 1. A partial band 305 may include a number of ports and a number of FD units 320 (e.g., subbands, resource blocks, etc.). A UE may report CSI for one or more partial bands 305, which may improve CSI quality and improve system efficiency. The channel state information reporting techniques 300 may illustrate a number of CSI-RS precoders that each correspond to an FD unit 320 of a partial band 305. In some cases, the expression $b_i$ is an nTx*1 vector representing an SD basis where nTx is the number of antenna ports at the gNB, the expression $$f_m^H \text{ is a } 1*N_3/2FD$$

basis where $$f_m^H(n)$$

denotes the $n^{th}$ entry of $$f_m^H,$$

and $N_3$ is the number of FD units across all partial bands. For each port 310, the combination of FD basis and SD basis may be different. Each partial band 305 may use the same FD/SD pair, a different FD/SD pair, or any combination thereof.

A UE may report partial band CSI to a base station, and the partial band CSI may indicate a PMI that is a linear combination of ports. In some cases, the PMI for certain layer l on a partial band 305 may be expressed by $W_j$, where "j" is the index of the partial band 305. For example, the PMI on partial band 305-*a* may be expressed by $W_j = \Sigma v_{i_k,j,l} * c_{i_k,j,l}$, where $v_{i_k,j,l}$ is the size of P×1 with only one "1" in row $i_k$ indicating port $i_k$ is selected for layer l and partial band j, P is the total number of CSI-RS ports, and $c_{i_k,j,l}$ is a linear combination coefficient. In some cases, the UE may report CSI for a group of partial bands, and the CSI may indicate a PMI for each partial band 305 in the group of partial bands.

In some cases, a number of ports may be selected for each partial band 305. In some examples, a UE may select a set of ports for one more partial bands 305, and the selected set of ports may be signaled to a base station (e.g., via a CSI-RS resource indication (CRI). For example, port 310-*a* may correspond to port 0 for partial band 305-*a*, port 310-*b* may correspond to port 1 for partial band 305-*a*, port 310-*c* may correspond to port 2 for partial band 305-*a*, and port 310-*d* may correspond to port 3 for partial band 305-*a*, port 315-*a* may correspond to port 0 for partial band 305-*b*, port 315-*b* may correspond to port 1 for partial band 305-*b*, port 315-*c* may correspond to port 2 for partial band 305-*b*, and port 315-*d* may correspond to port 3 for partial band 305-*b*. In some cases, the UE may indicate a selected set of ports to a base station, and the selected set of ports may be common for all partial bands 305.

In some cases, CSI-RS on different partial bands are transmitted in the same CSI-RS resource (i.e., ports 310 and 315 are in the same CSI-RS resource), a UE may select ports for each partial band from the same CSI-RS resource (UE may report CRI to indicate the resource if there are multiple resources). In some cases, CSI-RS on different partial bands are transmitted in different CSI-RS resources, a UE may select ports for each partial band from the corresponding CSI-RS resource. Ports 310 are in resource 1 and ports 315 are in resource 2, then UE selects ports for partial band 305-*a* using resource 1 and selects ports for partial band 305-*b* using resource 2. In some cases, there are N_PB partial bands, and M*N_PB resources. In each resource, the CSI-RS is transmitted on a certain partial band, so there are M resources transmitted on certain partial bands, i.e., resource 1 to resource M comprise CSI-RS on partial band 1, resource M+1 to resource 2*M comprise CSI-RS on partial band 2, . . . resource n*M+1 to resource (n+1)*M comprise CSI-RS on partial band n+1, . . . , resource (N_PB−1)*M+1 to resource N_PB*M comprise CSI-RS on partial band N_PB. UE would report CRI to indicate one resource from resource 1 to resource M for partial band 1, one resource from resource M+1 to resource 2*M for on partial band 2, . . . , one resource from resource n*M+1 to resource (n+1)*M for partial band n+1, . . . , one resource from resource (N_PB−1)*M+1 to resource N_PB*M for partial band N_PB, and UE may further report port selection from the corresponding selected resource for the associated partial band.

A UE may select ports that are specific to each partial band 305. In some cases, the UE may perform a one-step port selection wherein a number of partial band specific port sets are selected and reported to a base station. In some examples, the UE may be configured with a resource (e.g., a total set of ports that is common to all partial bands 305), and the UE may select first set of ports (e.g., ports 310) applied to each layer or across layers from the resource for partial band 305-*a* and a second set of ports (e.g., ports 315) from the same resource for partial band 305-*b*. In some additional or alternative examples, the UE may be configured with partial band specific resources, and the UE may select a set of ports applied to each layer or across layers from a partial band specific resource for each partial band 305. For example, a UE may select ports 310 from a set of ports in the resource associated with partial band 305-*a* for partial band 305-*a*, and the UE may select ports 315 from a set of ports in the resource associated with partial band 305-*b* for partial band 305-*b*.

A UE may perform a two-step port selection. In two-selection, a UE may report an intermediate set of ports that is common to (each layer or across layers) all partial bands 305 as well as a number of partial band specific port sets (applied to each layer or across layers) that are selected from the intermediate set. In some examples, a UE may independently report a first set of ports (e.g., ports 310) from the intermediate set of ports and a second set of ports (e.g., ports 315) from the intermediate set of ports. The size of the intermediate set may be configurable. In some cases, a UE may be pre-configured with an intermediate set size, or a base station may indicate to the UE an intermediate set size. In some cases, the size of the intermediate set may be derived based on the number of ports allowed to be selected on each partial band for each layer or across all layers. In some cases, a UE may report the size of the intermediate set (e.g., report the size to a base station). In some additional or alternative examples, a UE may report a set of ports that is common to all partial bands 305 as well as a set of ports that is associated with a particular partial band 305. The UE may additionally report a partial band specific set of ports for each partial band 305, and each partial band specific set of ports may be independently chosen from the union of the set of ports that is common to all partial bands 305 and the set of ports that is associated with a particular partial band 305.

In some cases, a UE may be configured (e.g., via an RRC procedure) with a frequency domain restriction for channel measurement, and the UE may calculate channel state information based on the frequency domain restriction. For example, the UE may be configured to perform a channel measurement in partial band 305-*a* as well as partial band 305-*b*, and the UE may calculate channel state information for partial band 305-*a* and partial band 305-*b*. For partial band CSI reporting, if a frequency domain restriction for channel measurement is configured, the UE shall derive the channel measurements for computing CSI value reported in uplink slot "n" based on only the NZP CSI-RS, within each partial band associated with the CSI resource setting.

In some additional or alternative cases, a UE may be configured (e.g., via an RRC procedure) with an interference measurement restriction, and the UE may measure interference and calculate channel state information based on the interference measurement restriction. For example, the UE may be configured to perform an interference measurement in partial band 305-*a* as well as partial band 305-*b*, and the UE may measure interference and calculate channel state information for partial band 305-*a* and partial band 305-*b*. For partial band CSI reporting, if an interference measurement restriction is configured, the UE shall derive the interference measurements for computing CSI value reported in uplink slot "n" based on only the NZP CSI-RS, within each partial band associated with the CSI resource setting.

Figure 4:
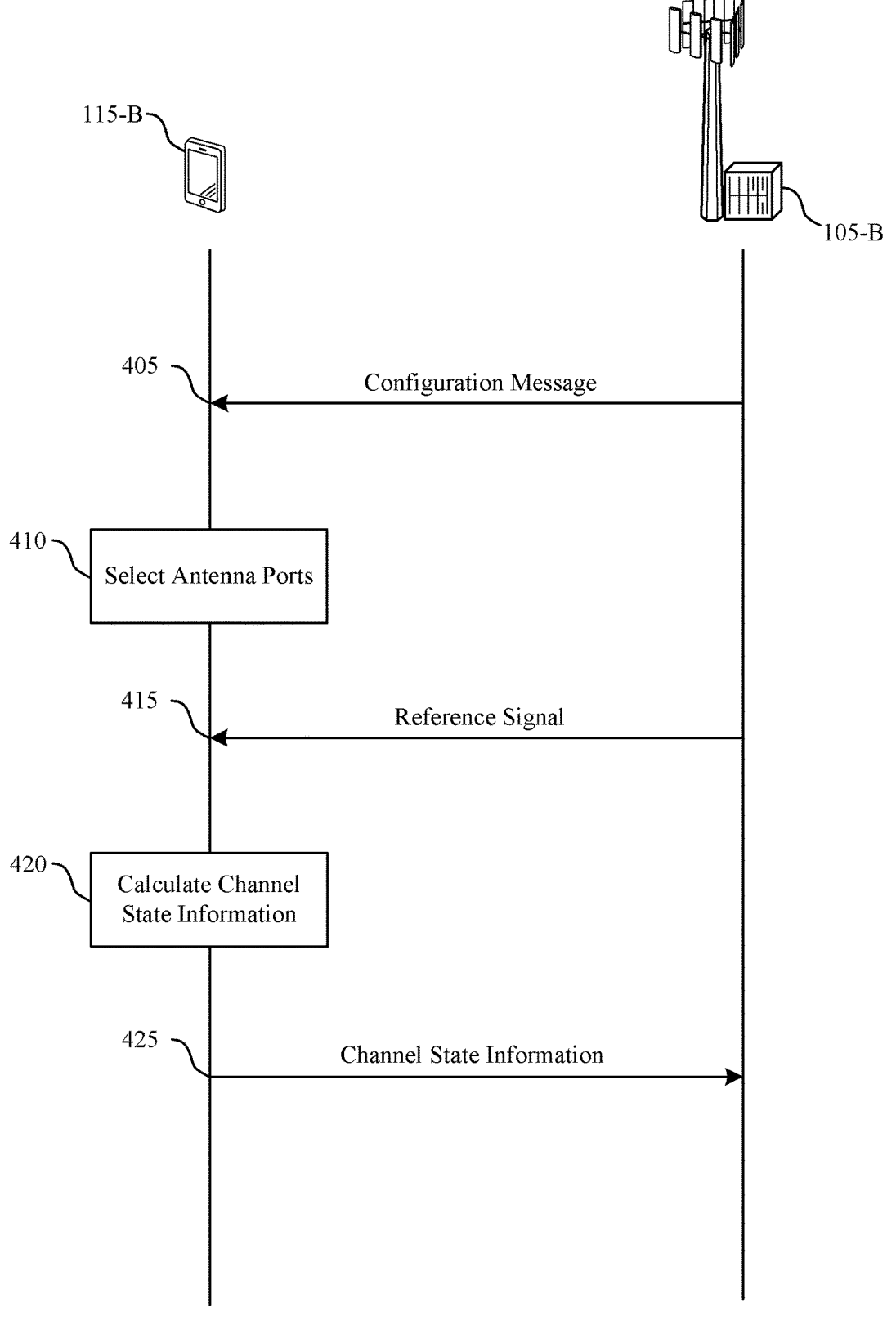
FIG. 4 illustrates an example of a process flow that supports channel state information reporting for partial bands in accordance with aspects of the present disclosure.

FIG. 4 illustrates an example of a process flow 400 that supports channel state information reporting for partial bands in accordance with aspects of the present disclosure. In some examples, process flow 400 may implement aspects of wireless communication system 100. UE 115-*b* and/or base station 105-*b* may support partial band CSI (e.g., CSI that is associated with a partial band) in accordance with aspects of the present disclosure. Partial band CSI may be more granular than system wide CSI and may improve the quality of the channel state information reported to a base station. Alternative examples of the following may be implemented, where some steps are performed in a different order than described or are not performed at all. In some cases, steps may include additional features not mentioned below, or further steps may be added.

At 405, UE 115-*b* may receive a configuration message from base station 105-*b*, and the configuration message may include an indication of one or more partial bands for CSI reporting. Each partial band of the one or more partial bands may be less than a system bandwidth and include a plurality of frequency domain units associated with a precoder.

At 410, UE 115-*b* may select one or more antenna ports (e.g., CSI-RS ports) for each partial band of the one or more partial bands based on the configuration message. For example, the configuration message may indicate a group of antenna ports, a number of antenna ports, a minimum number of antenna ports, or a maximum number of antenna ports, and UE 115-*b* may select the one or more antenna ports based on the configuration message.

At 415, UE 115-*b* may receive a reference signal (e.g., a CSI-RS) from base station 105-*a*. UE 115-*b* may measure the received reference signal at the selected one or more antenna ports and generate CSI coefficients for the one or more partial bands.

At 420, UE 115-*b* may calculate CSI including a linear combination of the selected one or more antenna ports for each partial band. In some examples, the CSI may include or be based on the generated CSI coefficients. In some cases, UE 115-*b* may select one or more antenna ports (e.g., CSI-RS ports) for each partial band at 420. For example, UE 115-*b* may refrain from selecting antenna ports at 410, and UE 115-*b* may select one or more antenna ports at 420. The CSI may include an indication of a PMI that includes the port selection and the linear combination coefficients. In some cases, the CSI may include a CQI, and the CQI may be calculated based on the PMI.

At 425, UE 115-*b* may transmit the CSI to base station 105-*b*. The CSI may include an indication of the selected antenna ports and linear combination coefficients for each partial band of the one or more partial bands.

Base station 105-*b* may transmit updated transmission parameters to UE 115-*b* for further communication with base station 105-*b*. The updated transmission parameters may increase the data rate of UE 115-*b* and be based on receiving the CSI coefficients.

In some cases, UE 115-*b* may receive an aperiodic CSI triggering and report CSI to a base station based on receiving the aperiodic CSI trigger. UE 115-*b* may calculate and transmit CSI to base station 105-*b* based on receiving an aperiodic CSI trigger, and the CSI may include a linear combination of one or more antenna ports for each partial band of a group of one or more partial bands.

Figure 5:
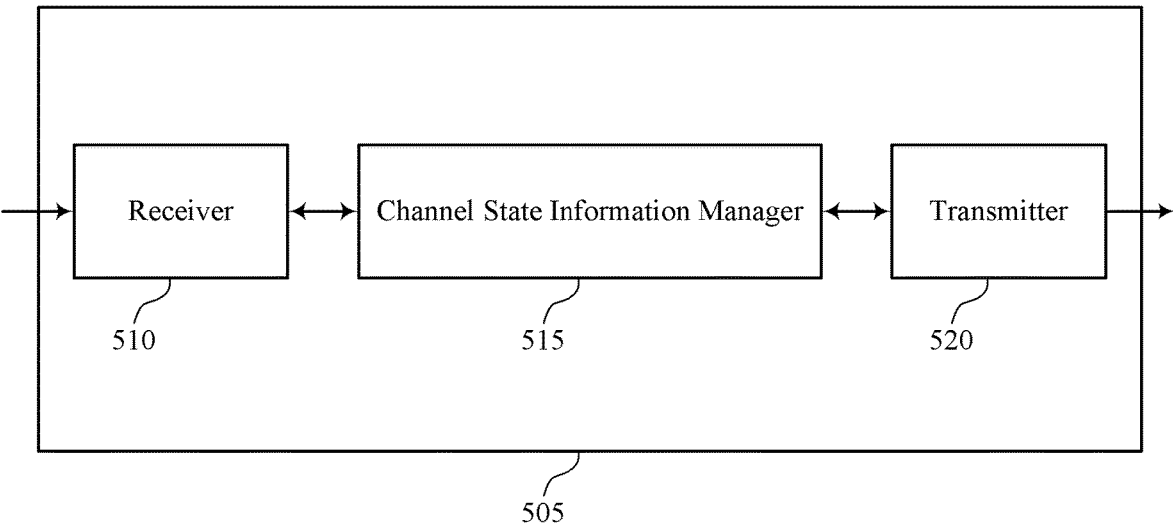
FIGS. 5 and 6 show block diagrams of devices that support channel state information reporting for partial bands in accordance with aspects of the present disclosure.

FIG. 5 shows a block diagram 500 of a device 505 that supports channel state information reporting for partial bands in accordance with aspects of the present disclosure. The device 505 may be an example of aspects of a UE 115 as described herein. The device 505 may include a receiver 510, a channel state information manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to channel state information reporting for partial bands, etc.). Information may be passed on to other components of the device 505. The receiver 510 may be an example of aspects of the transceiver 820 described with reference to FIG. 8. The receiver 510 may utilize a single antenna or a set of antennas.

The channel state information manager 515 may receive from a base station a configuration message including an indication of one or more partial bands for channel state information reporting, where each partial band of the one or more partial bands is less than a system bandwidth and includes a set of frequency domain units associated with a precoder, select one or more antenna ports for each partial band of the one or more partial bands based on the configuration message, calculate channel state information including a linear combination of the selected one or more antenna ports for each partial band, based on receiving the configuration message, and transmit the channel state information including at least an indication of the selected antenna ports and linear combination coefficients for each partial band of the one or more partial bands. The channel state information manager 515 may be an example of aspects of the channel state information manager 810 described herein.

The channel state information manager 515, or its subcomponents, may be implemented in hardware, code (e.g., software or firmware) executed by a processor, or any combination thereof. If implemented in code executed by a processor, the functions of the channel state information manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The channel state information manager 515, or its subcomponents, may be physically located at various positions, including being distributed such that portions of functions are implemented at different physical locations by one or more physical components. In some examples, the channel state information manager 515, or its sub-components, may be a separate and distinct component in accordance with various aspects of the present disclosure. In some examples, the channel state information manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas. The channel state information manager 515 may improve the quality of CSI reported by the device 505, increase the data rate of the device 505, and improve the link quality between the device 505 and a base station.

Figure 6:
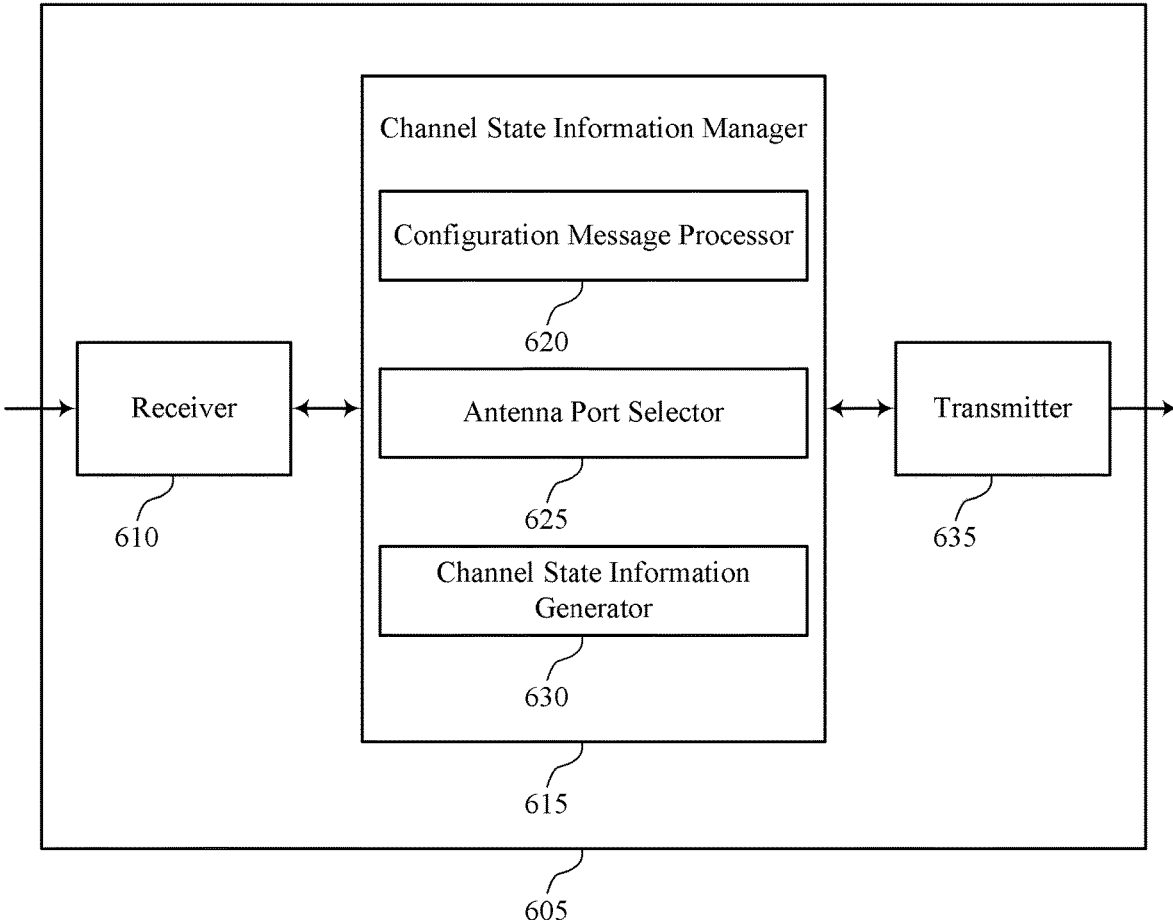

FIG. 6 shows a block diagram 600 of a device 605 that supports channel state information reporting for partial bands in accordance with aspects of the present disclosure. The device 605 may be an example of aspects of a device 505, or a UE 115 as described herein. The device 605 may include a receiver 610, a channel state information manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to channel state information reporting for partial bands, etc.). Information may be passed on to other components of the device 605. The receiver 610 may be an example of aspects of the transceiver 820 described with reference to FIG. 8. The receiver 610 may utilize a single antenna or a set of antennas.

The channel state information manager 615 may be an example of aspects of the channel state information manager 515 as described herein. The channel state information manager 615 may include a configuration message processor 620, an antenna port selector 625, and a channel state information generator 630. The channel state information manager 615 may be an example of aspects of the channel state information manager 810 described herein.

The configuration message processor 620 may receive from a base station a configuration message including an indication of one or more partial bands for channel state information reporting, where each partial band of the one or more partial bands is less than a system bandwidth and includes a set of frequency domain units associated with a precoder.

The antenna port selector 625 may select one or more antenna ports for each partial band of the one or more partial bands based on the configuration message.

The channel state information generator 630 may calculate channel state information including a linear combination of the selected one or more antenna ports for each partial band, based on receiving the configuration message and transmit the channel state information including at least an indication of the selected antenna ports and linear combination coefficients for each partial band of the one or more partial bands.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
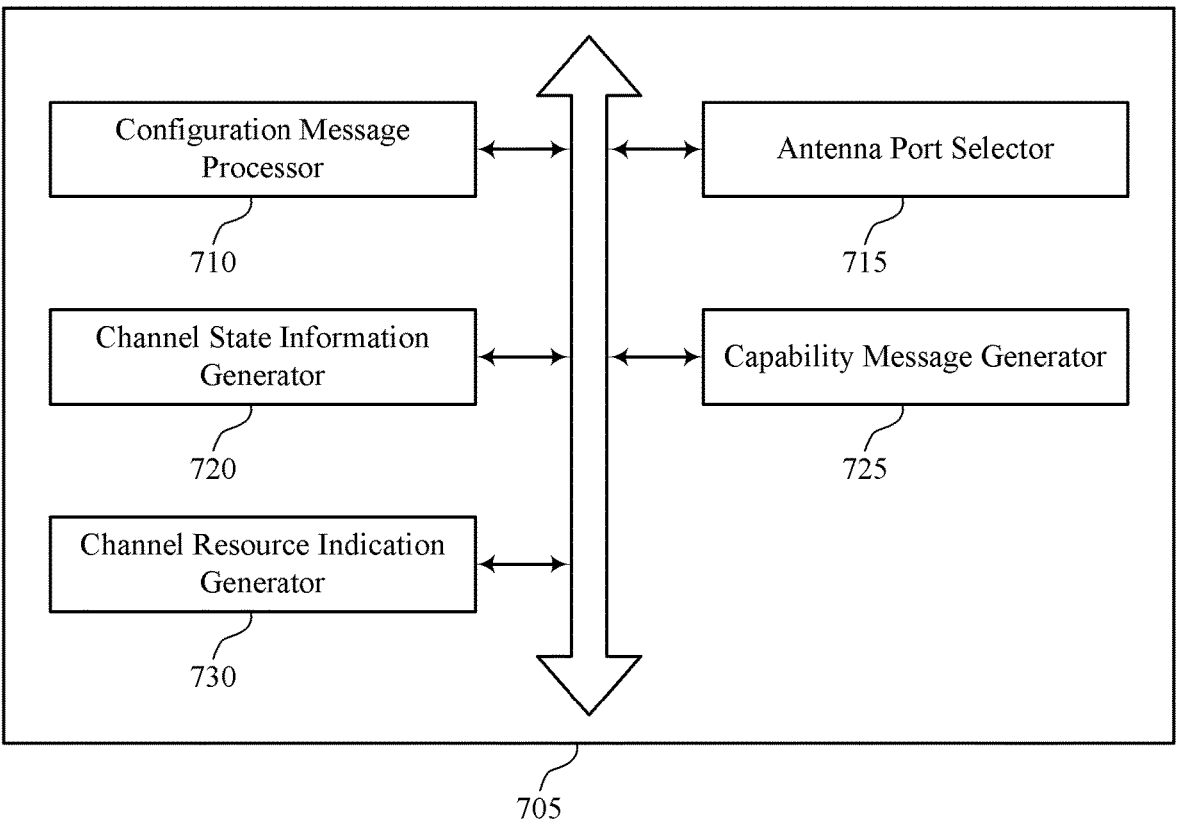
FIG. 7 shows a block diagram of a channel state information manager that supports channel state information reporting for partial bands in accordance with aspects of the present disclosure.

FIG. 7 shows a block diagram 700 of a channel state information manager 705 that supports channel state information reporting for partial bands in accordance with aspects of the present disclosure. The channel state information manager 705 may be an example of aspects of a channel state information manager 515, a channel state information manager 615, or a channel state information manager 810 described herein. The channel state information manager 705 may include a configuration message processor 710, an antenna port selector 715, a channel state information generator 720, a capability message generator 725, and a channel resource indication generator 730. Each of these modules may communicate, directly or indirectly, with one another (e.g., via one or more buses).

The configuration message processor 710 may receive from a base station a configuration message including an indication of one or more partial bands for channel state information reporting, where each partial band of the one or more partial bands is less than a system bandwidth and includes a set of frequency domain units associated with a precoder.

The antenna port selector 715 may select one or more antenna ports for each partial band of the one or more partial bands based on the configuration message.

In some examples, selecting the one or more antenna ports includes selecting a subset of a total number of antenna ports for each partial band of the one or more partial bands.

In some examples, the antenna port selector 715 may select the one or more antenna ports for each partial band based on the joint indication.

In some examples, transmitting to the base station a report of the one or more antenna ports selected for each partial band of the one or more partial bands, where the report of the one or more antenna ports selected for each partial band includes an indication of a first set of antenna ports common to all partial bands of the one or more partial bands and, for each partial band of the one or more partial bands, an indication of a second set of antenna ports independently selected for that partial band, where the second set of antenna ports for each partial band is from the first set of antenna ports.

In some examples, the antenna port selector 715 may receive from the base station a configuration of a size of the first set of antenna ports and a size of the second set of antenna ports.

In some cases, a same subset of one or more CSI-RS ports is selected for each partial band of the one or more partial bands.

In some cases, the antenna ports include channel state information reference signal (CSI-RS) ports and the configuration message further includes a joint indication of partial bands and a numerical quantity of the CSI-RS ports.

In some cases, a number of partial bands, a partial band size, or a ratio of partial bands to frequency unit size; and one or more of: a number of total CSI-RS ports or a number of CSI-RS ports to be selected for each partial band.

The channel state information generator 720 may calculate channel state information including a linear combination of the selected one or more antenna ports for each partial band, based on receiving the configuration message.

In some examples, the channel state information generator 720 may transmit the channel state information including at least an indication of the selected antenna ports and linear combination coefficients for each partial band of the one or more partial bands.

In some examples, calculating the channel state information includes separately precoding each partial band of the one or more partial bands.

In some examples, the channel state information generator 720 may receive, from the base station, a configuration of frequency domain restriction for channel measurement.

In some examples, determining that a frequency domain restriction for channel measurement is in place based on the configuration of frequency domain restriction for channel measurement, where calculating the channel information for each partial band of the one or more partial bands includes restricting the channel state measurement to non-zero power channel state information reference signals within each partial band.

In some examples, the channel state information generator 720 may receive, from the base station, a configuration of frequency domain restriction for interference measurement.

In some examples, determining that a frequency domain restriction for interference measurement is in place based on the configuration of frequency domain restriction for channel measurement, where performing interference measurement for each partial band of the one or more partial bands includes restricting the interference measurement to zero or non-zero interference measurement resources within each partial band.

In some cases, the indication of one or more partial bands for channel state reporting includes one or more of a numerical quantity of partial bands for which the UE is to perform channel state measurement, or a partial band size for which the UE is to perform channel state measurement, or a ratio of partial band size to frequency domain unit size.

In some cases, the indication of one or more partial bands is dependent on an indication of a numerical quantity of antenna ports to select for each partial band of the one or more partial bands, or a numerical quantity of total antenna ports, and selecting the one or more antenna ports for each partial band is based on the indicated numerical quantity.

In some cases, a frequency domain unit of the set of frequency domain units corresponds to a subband size for channel quality indicator (CQI) reporting.

The capability message generator 725 may transmit to the base station a capability message indicating a numerical quality of partial bands for which the UE is capable of performing channel measurement, where the configuration message is based on the capability message.

The channel resource indication generator 730 may transmit to the base station a report of a resource selection for the channel state measurement for each partial band of the one or more partial bands.

Figure 8:
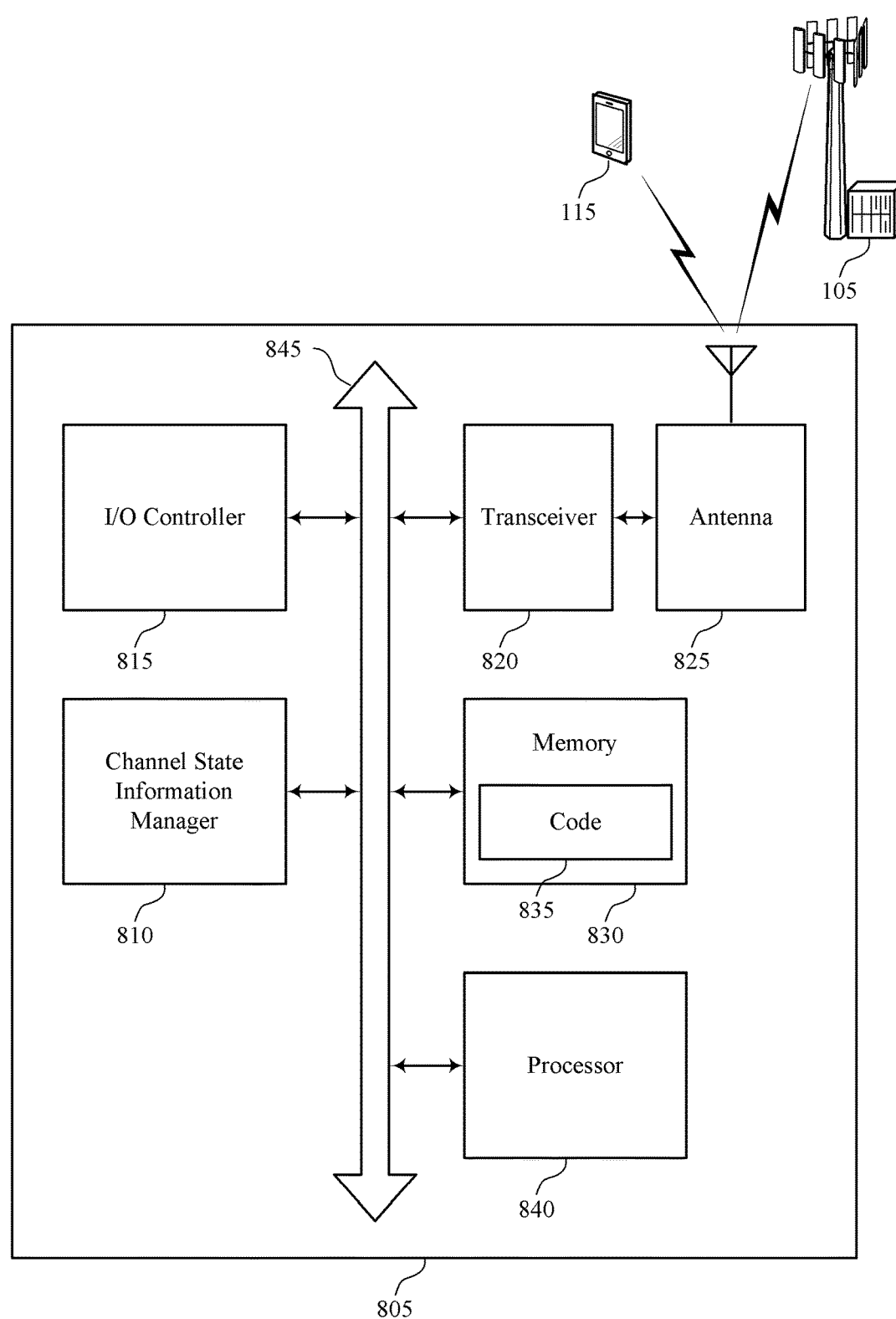
FIG. 8 shows a diagram of a system including a device that supports channel state information reporting for partial bands in accordance with aspects of the present disclosure.

FIG. 8 shows a diagram of a system 800 including a device 805 that supports channel state information reporting for partial bands in accordance with aspects of the present disclosure. The device 805 may be an example of or include the components of device 505, device 605, or a UE 115 as described herein. The device 805 may include components for bi-directional voice and data communications including components for transmitting and receiving communications, including a channel state information manager 810, an I/O controller 815, a transceiver 820, an antenna 825, memory 830, and a processor 840. These components may be in electronic communication via one or more buses (e.g., bus 845).

The channel state information manager 810 may receive from a base station a configuration message including an indication of one or more partial bands for channel state information reporting, where each partial band of the one or more partial bands is less than a system bandwidth and includes a set of frequency domain units associated with a precoder, select one or more antenna ports for each partial band of the one or more partial bands based on the configuration message, calculate channel state information including a linear combination of the selected one or more antenna ports for each partial band, based on receiving the configuration message, and transmit the channel state information including at least an indication of the selected antenna ports and linear combination coefficients for each partial band of the one or more partial bands.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include a programmable hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting channel state information reporting for partial bands).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein. The channel state information manager 810 may increase the granularity of CSI reported by the device 805. Increased CSI granularity may enhance the quality of the CSI and improve the efficiency of the device 805.

Figure 9:
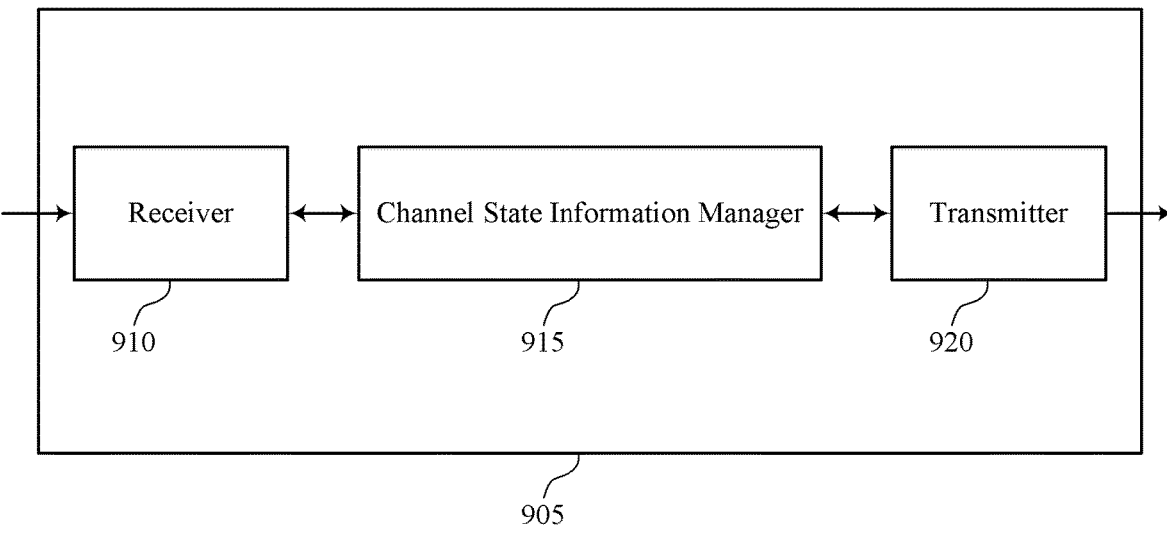
FIGS. 9 and 10 show block diagrams of devices that support channel state information reporting for partial bands in accordance with aspects of the present disclosure.

FIG. 9 shows a block diagram 900 of a device 905 that supports channel state information reporting for partial bands in accordance with aspects of the present disclosure.

The device 905 may be an example of aspects of a base station 105 as described herein. The device 905 may include a receiver 910, a channel state information manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to channel state information reporting for partial bands, etc.). Information may be passed on to other components of the device 905. The receiver 910 may be an example of aspects of the transceiver 1220 described with reference to FIG. 12. The receiver 910 may utilize a single antenna or a set of antennas.

The channel state information manager 915 may transmit to a UE a configuration message including an indication of one or more partial bands for channel state information reporting, where each partial band of the one or more partial bands is less than a system bandwidth and includes a set of frequency domain units associated with a precoder, receive channel state information including an indication of antenna ports and linear combination coefficients for each partial band of the one or more partial bands based on transmitting the configuration message and the channel state measurement, and communicate with the UE based on receiving the channel state information for each partial band of the one or more partial bands. The channel state information manager 915 may be an example of aspects of the channel state information manager 1210 described herein.

The channel state information manager 915, or its sub-components, may be implemented in hardware, code (e.g., software or firmware) executed by a processor, or any combination thereof. If implemented in code executed by a processor, the functions of the channel state information manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The channel state information manager 915, or its sub-components, may be physically located at various positions, including being distributed such that portions of functions are implemented at different physical locations by one or more physical components. In some examples, the channel state information manager 915, or its sub-components, may be a separate and distinct component in accordance with various aspects of the present disclosure. In some examples, the channel state information manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas. The channel state information manager 915 may improve the quality of CSI reported by the device 905, increase the data rate of the device 905, and improve the link quality between the device 905 and a base station.

Figure 10:
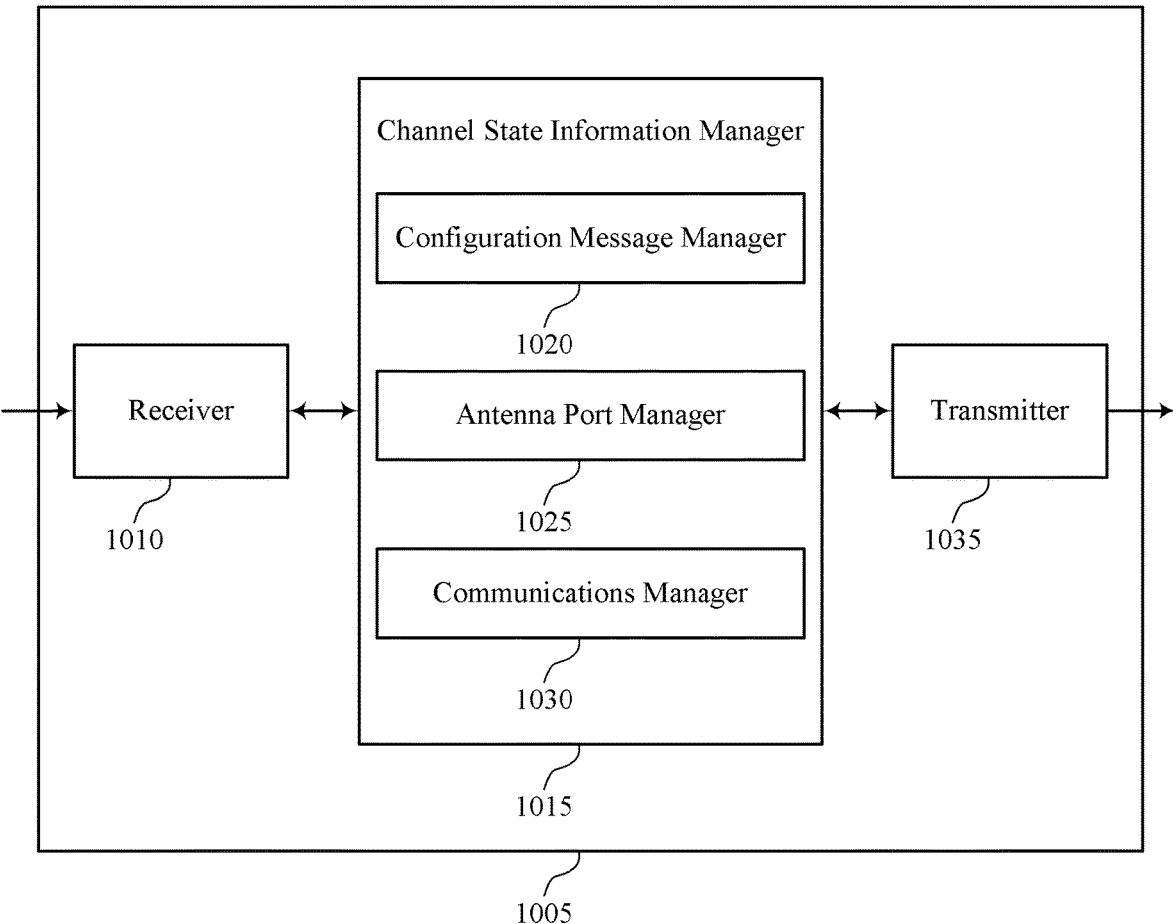

FIG. 10 shows a block diagram 1000 of a device 1005 that supports channel state information reporting for partial bands in accordance with aspects of the present disclosure. The device 1005 may be an example of aspects of a device 905, or a base station 105 as described herein. The device 1005 may include a receiver 1010, a channel state information manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to channel state information reporting for partial bands, etc.). Information may be passed on to other components of the device 1005. The receiver 1010 may be an example of aspects of the transceiver 1220 described with reference to FIG. 12. The receiver 1010 may utilize a single antenna or a set of antennas.

The channel state information manager 1015 may be an example of aspects of the channel state information manager 915 as described herein. The channel state information manager 1015 may include a configuration message manager 1020, an antenna port manager 1025, and a communications manager 1030. The channel state information manager 1015 may be an example of aspects of the channel state information manager 1210 described herein.

The configuration message manager 1020 may transmit to a UE a configuration message including an indication of one or more partial bands for channel state information reporting, where each partial band of the one or more partial bands is less than a system bandwidth and includes a set of frequency domain units associated with a precoder.

The antenna port manager 1025 may receive channel state information including an indication of antenna ports and linear combination coefficients for each partial band of the one or more partial bands based on transmitting the configuration message and the channel state measurement.

The communications manager 1030 may communicate with the UE based on receiving the channel state information for each partial band of the one or more partial bands.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
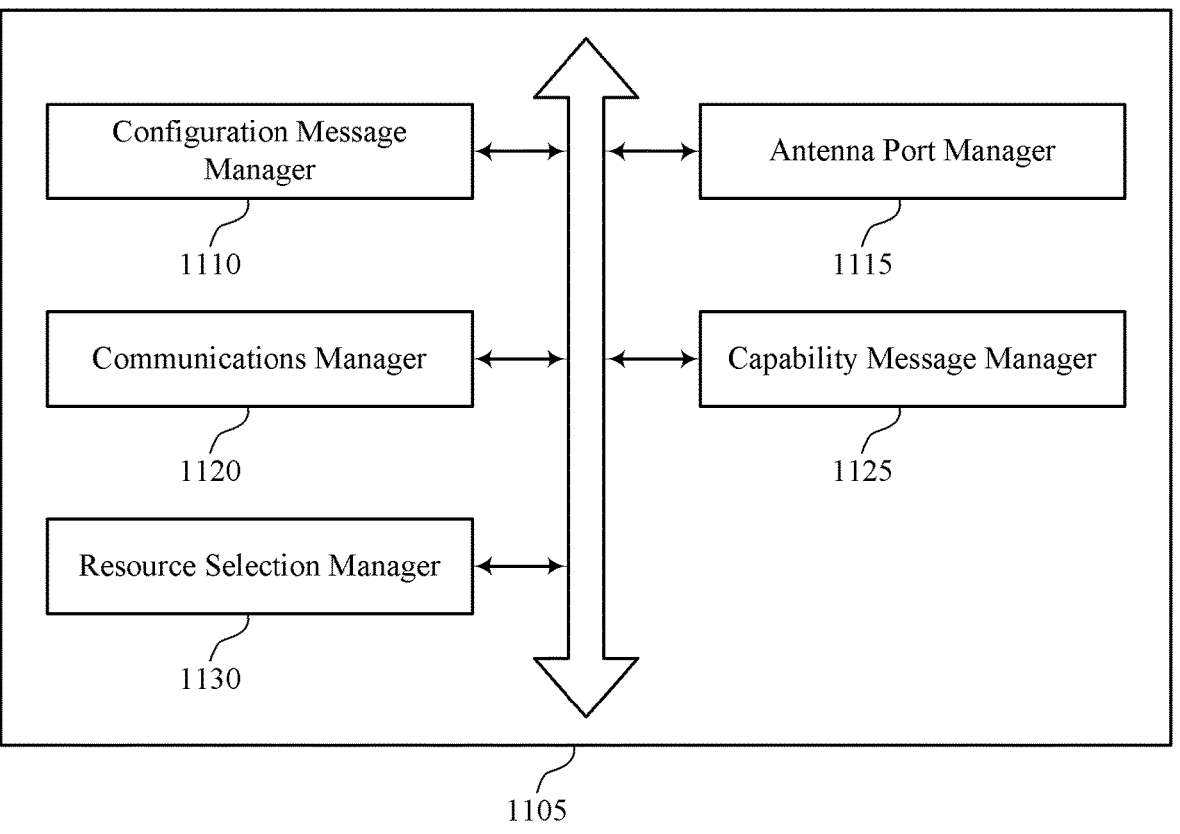
FIG. 11 shows a block diagram of a channel state information manager that supports channel state information reporting for partial bands in accordance with aspects of the present disclosure.

FIG. 11 shows a block diagram 1100 of a channel state information manager 1105 that supports channel state information reporting for partial bands in accordance with aspects of the present disclosure. The channel state information manager 1105 may be an example of aspects of a channel state information manager 915, a channel state information manager 1015, or a channel state information manager 1210 described herein. The channel state information manager 1105 may include a configuration message manager 1110, an antenna port manager 1115, a communications manager 1120, a capability message manager 1125, and a resource selection manager 1130. Each of these modules may communicate, directly or indirectly, with one another (e.g., via one or more buses).

The configuration message manager 1110 may transmit to a UE a configuration message including an indication of one or more partial bands for channel state information reporting, where each partial band of the one or more partial bands is less than a system bandwidth and includes a set of frequency domain units associated with a precoder.

In some examples, the configuration message manager 1110 may transmit, to the UE, a configuration of frequency domain restriction for channel measurement.

In some examples, the configuration message manager 1110 may receive the channel state information based on channel measurement of non-zero power channel state information reference signals within each partial band.

In some examples, the configuration message manager 1110 may transmit, to the UE, a configuration of frequency domain restriction for interference measurement.

In some examples, the configuration message manager 1110 may receive the channel state information based on interference measurement of interference measurement resources within each partial band.

In some cases, the indication of one or more partial bands for channel state reporting includes one or more of a numerical quantity of partial bands for which the UE is to perform channel state measurement, or a partial band size for which the UE is to perform channel state measurement, or a ratio of partial band size to frequency domain unit size.

In some cases, the indication of one or more partial bands is dependent on an indication of a numerical quantity of antenna ports to select for each partial band of the one or more partial bands, or a numerical quantity of total antenna ports, and selecting the one or more antenna ports for each partial band is based on the indicated numerical quantity.

The antenna port manager 1115 may receive channel state information including an indication of antenna ports and linear combination coefficients for each partial band of the one or more partial bands based on transmitting the configuration message and the channel state measurement.

In some examples, receiving a report from the UE of one or more antenna ports selected for each partial band of the one or more partial bands, where the report of the one or more antenna ports selected for each partial band includes an indication of a first set of antenna ports common to all partial bands of the one or more partial bands and, for each partial band of the one or more partial bands, an indication of a second set of antenna ports independently selected for that partial band, where the second set of antenna ports for each partial band is from the first set of antenna ports.

In some examples, the antenna port manager 1115 may transmit to the UE a configuration of a size of the first set of antenna ports and a size of the second set of antenna ports.

In some cases, the antenna ports include channel state information reference signal (CSI-RS) ports and the configuration message further includes a joint indication of partial bands and a numerical quantity of the CSI-RS ports.

In some cases, the one or more antenna ports for each partial band are selected based on the join indication.

In some cases, a number of partial bands, a partial band size, or a ratio of partial bands to frequency unit size; and one or more of: a number of total CSI-RS ports or a number of CSI-RS ports to be selected for each partial band.

The communications manager 1120 may communicate with the UE based on receiving the channel state information for each partial band of the one or more partial bands.

The capability message manager 1125 may receive a capability message from the UE indicating a numerical quality of partial bands for which the UE is capable of performing channel measurement, where the configuration message is based on the capability message.

The resource selection manager 1130 may receive from the UE a report of a resource selection for the channel state measurement for each partial band of the one or more partial bands.

Figure 12:
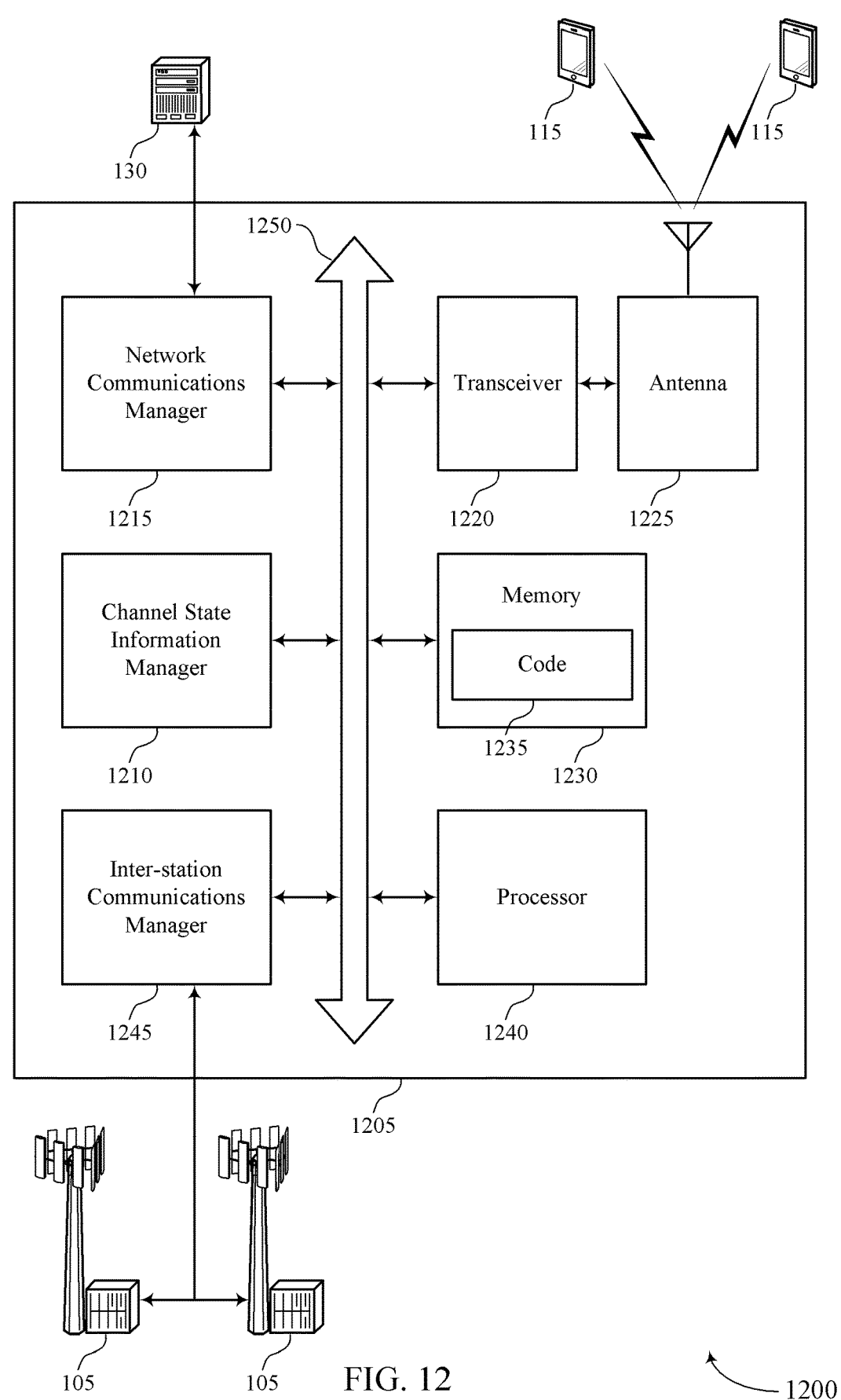
FIG. 12 shows a diagram of a system including a device that supports channel state information reporting for partial bands in accordance with aspects of the present disclosure.

FIG. 12 shows a diagram of a system 1200 including a device 1205 that supports channel state information reporting for partial bands in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a channel state information manager 1210, a network communications manager 1215, a transceiver 1220, an antenna 1225, memory 1230, a processor 1240, and an inter-station communications manager 1245. These components may be in electronic communication via one or more buses (e.g., bus 1250).

The channel state information manager 1210 may transmit to a UE a configuration message including an indication of one or more partial bands for channel state information reporting, where each partial band of the one or more partial bands is less than a system bandwidth and includes a set of frequency domain units associated with a precoder, receive channel state information including an indication of antenna ports and linear combination coefficients for each partial band of the one or more partial bands based on transmitting the configuration message and the channel state measurement, and communicate with the UE based on receiving the channel state information for each partial band of the one or more partial bands.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting channel state information reporting for partial bands).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein. The channel state information manager 1210 may increase the granularity of CSI reported by the device 1205. Increased CSI granularity may enhance the quality of the CSI and improve the efficiency of the device 1205.

FIG. 13 shows a flowchart illustrating a method 1300 that supports channel state information reporting for partial bands in accordance with aspects of the present disclosure. The operations of method 1300 may be implemented by a UE 115 or its components as described herein. For example, the operations of method 1300 may be performed by a channel state information manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive from a base station a configuration message including an indication of one or more partial bands for channel state information reporting, where each partial band of the one or more partial bands is less than a system bandwidth and includes a set of frequency domain units associated with a precoder. The operations of 1305 may be performed according to the methods described herein. In some examples, aspects of the operations of 1305 may be performed by a configuration message processor as described with reference to FIGS. 5 through 8.

At 1310, the UE may select one or more antenna ports for each partial band of the one or more partial bands based on the configuration message. The operations of 1310 may be performed according to the methods described herein. In some examples, aspects of the operations of 1310 may be performed by an antenna port selector as described with reference to FIGS. 5 through 8.

At 1315, the UE may calculate channel state information including a linear combination of the selected one or more antenna ports for each partial band, based on receiving the configuration message. The operations of 1315 may be performed according to the methods described herein. In some examples, aspects of the operations of 1315 may be performed by a channel state information generator as described with reference to FIGS. 5 through 8.

At 1320, the UE may transmit the channel state information including at least an indication of the selected antenna ports and linear combination coefficients for each partial band of the one or more partial bands. The operations of 1320 may be performed according to the methods described herein. In some examples, aspects of the operations of 1320 may be performed by a channel state information generator as described with reference to FIGS. 5 through 8.

FIG. 14 shows a flowchart illustrating a method 1400 that supports channel state information reporting for partial bands in accordance with aspects of the present disclosure. The operations of method 1400 may be implemented by a UE 115 or its components as described herein. For example, the operations of method 1400 may be performed by a channel state information manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive from a base station a configuration message including an indication of one or more partial bands for channel state information reporting, where each partial band of the one or more partial bands is less than a system bandwidth and includes a set of frequency domain units associated with a precoder. The operations of 1405 may be performed according to the methods described herein. In some examples, aspects of the operations of 1405 may be performed by a configuration message processor as described with reference to FIGS. 5 through 8.

At 1410, the UE may select one or more antenna ports for each partial band of the one or more partial bands based on the configuration message. The operations of 1410 may be performed according to the methods described herein. In some examples, aspects of the operations of 1410 may be performed by an antenna port selector as described with reference to FIGS. 5 through 8.

At 1415, the UE may calculate channel state information including a linear combination of the selected one or more antenna ports for each partial band, based on receiving the configuration message. The operations of 1415 may be performed according to the methods described herein. In some examples, aspects of the operations of 1415 may be performed by a channel state information generator as described with reference to FIGS. 5 through 8.

At 1420, the UE may transmit the channel state information including at least an indication of the selected antenna ports and linear combination coefficients for each partial band of the one or more partial bands. The operations of 1420 may be performed according to the methods described herein. In some examples, aspects of the operations of 1420 may be performed by a channel state information generator as described with reference to FIGS. 5 through 8.

At 1425, the UE may the indication of one or more partial bands for channel state reporting includes one or more of a numerical quantity of partial bands for which the UE is to perform channel state measurement, or a partial band size for which the UE is to perform channel state measurement, or a ratio of partial band size to frequency domain unit size. The operations of 1425 may be performed according to the methods described herein. In some examples, aspects of the operations of 1425 may be performed by a channel state information generator as described with reference to FIGS. 5 through 8.

At 1430, the UE may transmit to the base station a capability message indicating a numerical quality of partial bands for which the UE is capable of performing channel measurement, where the configuration message is based on the capability message. The operations of 1430 may be performed according to the methods described herein. In some examples, aspects of the operations of 1430 may be performed by a capability message generator as described with reference to FIGS. 5 through 8.

FIG. 15 shows a flowchart illustrating a method 1500 that supports channel state information reporting for partial bands in accordance with aspects of the present disclosure. The operations of method 1500 may be implemented by a base station 105 or its components as described herein. For example, the operations of method 1500 may be performed by a channel state information manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may transmit to a UE a configuration message including an indication of one or more partial bands for channel state information reporting, where each partial band of the one or more partial bands is less than a system bandwidth and includes a set of frequency domain units associated with a precoder. The operations of 1505 may be performed according to the methods described herein. In some examples, aspects of the operations of 1505 may be performed by a configuration message manager as described with reference to FIGS. 9 through 12.

At 1510, the base station may receive channel state information including an indication of antenna ports and linear combination coefficients for each partial band of the one or more partial bands based on transmitting the configuration message and the channel state measurement. The operations of 1510 may be performed according to the methods described herein. In some examples, aspects of the operations of 1510 may be performed by an antenna port manager as described with reference to FIGS. 9 through 12.

At 1515, the base station may communicate with the UE based on receiving the channel state information for each partial band of the one or more partial bands. The operations of 1515 may be performed according to the methods described herein. In some examples, aspects of the operations of 1515 may be performed by a communications manager as described with reference to FIGS. 9 through 12.

FIG. 16 shows a flowchart illustrating a method 1600 that supports channel state information reporting for partial bands in accordance with aspects of the present disclosure. The operations of method 1600 may be implemented by a base station 105 or its components as described herein. For example, the operations of method 1600 may be performed by a channel state information manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may transmit to a UE a configuration message including an indication of one or more partial bands for channel state information reporting, where each partial band of the one or more partial bands is less than a system bandwidth and includes a set of frequency domain units associated with a precoder. The operations of 1605 may be performed according to the methods described herein. In some examples, aspects of the operations of 1605 may be performed by a configuration message manager as described with reference to FIGS. 9 through 12.

At 1610, the base station may receive channel state information including an indication of antenna ports and linear combination coefficients for each partial band of the one or more partial bands based on transmitting the configuration message and the channel state measurement. The operations of 1610 may be performed according to the methods described herein. In some examples, aspects of the operations of 1610 may be performed by an antenna port manager as described with reference to FIGS. 9 through 12.

At 1615, the base station may communicate with the UE based on receiving the channel state information for each partial band of the one or more partial bands. The operations of 1615 may be performed according to the methods described herein. In some examples, aspects of the operations of 1615 may be performed by a communications manager as described with reference to FIGS. 9 through 12.

At 1620, the base station may receive a capability message from the UE indicating a numerical quality of partial bands for which the UE is capable of performing channel measurement, where the configuration message is based on the capability message. The operations of 1620 may be performed according to the methods described herein. In some examples, aspects of the operations of 1620 may be performed by a capability message manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:

receiving, from a network node, a configuration message comprising an indication of one or more partial bands for channel state information reporting and an indication of one or more antenna ports for each partial band of the one or more partial bands, wherein each partial band of the one or more partial bands is less than a system bandwidth and comprises a plurality of frequency domain units, and wherein each frequency domain unit of the plurality of frequency domain units is associated with a precoder;

selecting, by the UE, one or more antenna ports for each partial band of the one or more partial bands based at least in part on the configuration message and the indication of the one or more antenna ports;

calculating channel state information comprising a linear combination of the selected one or more antenna ports for each partial band, based at least in part on receiving the configuration message; and transmitting the channel state information comprising at least an indication of the selected one or more antenna ports and linear combination coefficients for each partial band of the one or more partial bands in accordance with the indication of the one or more antenna ports.

2. The method of claim 1, wherein the one or more antenna ports comprise channel state information reference signal (CSI-RS) ports, and wherein selecting the one or more antenna ports comprises:

selecting a subset of a total number of antenna ports for each partial band of the one or more partial bands in accordance with the indication of the one or more antenna ports.

3. The method of claim 2, wherein selecting the subset of the total number of antenna ports for each partial band comprises:

selecting a same subset of one or more CSI-RS ports for each different partial band of the one or more partial bands.

4. The method of claim 1, wherein:

calculating the channel state information comprises separately precoding each partial band of the one or more partial bands.

5. The method of claim 1, wherein the indication of the one or more partial bands for channel state information reporting comprises one or more of a numerical quantity of partial bands for which the UE is to perform channel state measurements, or a partial band size for which the UE is to perform the channel state measurements, or a ratio of partial band size to frequency domain unit size.

6. The method of claim 5, further comprising:

transmitting, to the network node, a capability message indicating a numerical quality of partial bands for which the UE is capable of performing the channel state measurements, wherein the configuration message is based at least in part on the capability message.

7. The method of claim 5, wherein the indication of the one or more partial bands is dependent on an indication of a numerical quantity of antenna ports to select for each partial band of the one or more partial bands or a numerical quantity of total antenna ports, and wherein selecting the one or more antenna ports for each partial band is based at least in part on the indicated numerical quantity of antenna ports or the indicated numerical quantity of total antenna ports.

8. The method of claim 1, wherein:

the one or more antenna ports comprise channel state information reference signal (CSI-RS) ports and the configuration message further comprises an indication of partial bands and a numerical quantity of the CSI-RS ports; and selecting the one or more antenna ports for each partial band is based at least in part on the indication of the partial bands and the numerical quantity of the CSI-RS ports.

9. The method of claim 8, wherein the indication of the partial bands and the numerical quantity of the CSI-RS ports comprises one or more of: a number of partial bands, a partial band size, or a ratio of partial bands to frequency unit size; and the indication of the partial bands and the numerical quantity of the CSI-RS ports further comprises one or more of: a number of total CSI-RS ports or a number of CSI-RS ports to be selected for each partial band.

10. The method of claim 1, further comprising:

transmitting, to the network node, a report of the one or more antenna ports selected for each partial band of the one or more partial bands, wherein the report comprises an indication of a first set of antenna ports common to all partial bands of the one or more partial bands and, for each partial band of the one or more partial bands, an indication of a respective second set of antenna ports independently selected for that partial band, wherein the one or more respective second sets of antenna ports for each partial band are from the first set of antenna ports.

11. The method of claim 10, further comprising:

receiving, from the network node, a configuration of a size of the first set of antenna ports and a size of the respective second set of antenna ports.

12. The method of claim 1, further comprising:

transmitting, to the network node, a report of a resource selection for a channel state measurement for each partial band of the one or more partial bands.

13. The method of claim 1, further comprising:

receiving, from the network node, a configuration of frequency domain restriction for channel measurements; and determining that a frequency domain restriction for channel measurements is in place based at least in part on the configuration of the frequency domain restriction for channel measurements, wherein calculating the channel state information for each partial band of the one or more partial bands comprises restricting channel state measurements to non-zero power channel state information reference signals within each partial band.

14. The method of claim 1, further comprising:

receiving, from the network node, a configuration of a frequency domain restriction for interference measurements; and determining that the frequency domain restriction for interference measurements is in place based at least in part on the configuration of the frequency domain restriction for interference measurements, wherein performing interference measurements for each partial band of the one or more partial bands comprises restricting the interference measurements to non-zero power interference measurement resources within each partial band.

15. The method of claim 1, wherein a frequency domain unit of the plurality of frequency domain units corresponds to a subband size for channel quality indicator (CQI) reporting.

16. A method for wireless communication at a network node, comprising:

transmitting, to a user equipment (UE), a configuration message comprising an indication of one or more partial bands for channel state information reporting and an indication of one or more antenna ports for each partial band of the one or more partial bands, wherein each partial band of the one or more partial bands is less than a system bandwidth and comprises a plurality of frequency domain units, and wherein each frequency domain unit of the plurality of frequency domain units is associated with a precoder;

receiving channel state information comprising an indication of the one or more antenna ports and linear combination coefficients for each partial band of the one or more partial bands based at least in part on transmitting the configuration message and channel state measurements; and communicating with the UE based at least in part on receiving the channel state information for each partial band of the one or more partial bands.

17. The method of claim 16, wherein the indication of the one or more partial bands for channel state information reporting comprises one or more of a numerical quantity of partial bands for which the UE is to perform the channel state measurements, or a partial band size for which the UE is to perform the channel state measurements, or a ratio of partial band size to frequency domain unit size.

18. The method of claim 17, wherein the indication of the one or more partial bands is dependent on an indication of a numerical quantity of antenna ports to select for each partial band of the one or more partial bands or a numerical quantity of total antenna ports.

19. The method of claim 16, further comprising:

receiving a capability message from the UE indicating a numerical quality of partial bands for which the UE is capable of performing the channel state measurements, wherein the configuration message is based at least in part on the capability message.

20. The method of claim 16, wherein:

the antenna ports comprise channel state information reference signal (CSI-RS) ports and the configuration message further comprises an indication of partial bands and a numerical quantity of the CSI-RS ports.

21. The method of claim 20, wherein the indication of the partial bands and the numerical quantity of the CSI-RS ports comprises one or more of: a number of partial bands, a partial band size, or a ratio of partial bands to frequency unit size; and the indication of the partial bands and the numerical quantity of the CSI-RS ports further comprises one or more of: a number of total CSI-RS ports or a number of CSI-RS ports to be selected for each partial band.

22. The method of claim 16, further comprising:

receiving a report from the UE of one or more antenna ports selected for each partial band of the one or more partial bands, wherein the report comprises an indication of a first set of antenna ports common to all partial bands of the one or more partial bands and, for each partial band of the one or more partial bands, an indication of a respective second set of antenna ports independently selected for that partial band, wherein the one or more respective second sets of antenna ports for each partial band are from the first set of antenna ports.

23. The method of claim 22, further comprising:

transmitting, to the UE, a configuration of a size of the first set of antenna ports and a size of the respective second set of antenna ports.

24. The method of claim 16, further comprising:

receiving, from the UE, a report of a resource selection for the channel state measurements for each partial band of the one or more partial bands.

25. The method of claim 16, further comprising:

transmitting, to the UE, a configuration of a frequency domain restriction for channel measurements; and receiving the channel state information based at least in part on channel state measurements of non-zero power channel state information reference signals within each partial band.

26. The method of claim 16, further comprising:

transmitting, to the UE, a configuration of a frequency domain restriction for interference measurement; and receiving the channel state information based at least in part on an interference measurement of interference measurement resources within each partial band.

27. An apparatus for wireless communication at a user equipment (UE), comprising:

one or more processors, one or more memories coupled with the one or more processors; and instructions stored in the one or more memories and executable by the one or more processors to cause the apparatus to:

receive, from a network node, a configuration message comprising an indication of one or more partial bands for channel state information reporting and an indication of one or more antenna ports for each partial band of the one or more partial bands, wherein each partial band of the one or more partial bands is less than a system bandwidth and comprises a plurality of frequency domain units, and wherein each frequency domain unit of the plurality of frequency domain units is associated with a precoder;

select, by the UE, one or more antenna ports for each partial band of the one or more partial bands based at least in part on the configuration message and the indication of the one or more antenna ports;

calculate channel state information comprising a linear combination of the selected one or more antenna ports for each partial band, based at least in part on receiving the configuration message; and transmit the channel state information comprising at least an indication of the selected one or more antenna ports and linear combination coefficients for each partial band of the one or more partial bands in accordance with the indication of the one or more antenna ports.

28. The apparatus of claim 27, wherein the one or more antenna ports comprise channel state information reference signal (CSI-RS) ports, and wherein the instructions to select the one or more antenna ports are executable by the one or more processors to cause the apparatus to:

select a subset of a total number of antenna ports for each partial band of the one or more partial bands in accordance with the indication of the one or more antenna ports.

29. The apparatus of claim 28, wherein the instructions to select the subset of the total number of antenna ports for each partial band comprise instructions executable by the one or more processors to cause the apparatus to:

select a same subset of one or more CSI-RS ports for each different partial band of the one or more partial bands.

30. The apparatus of claim 27, wherein the instructions to calculate the channel state information comprise instructions executable by the one or more processors to separately precode each partial band of the one or more partial bands.

31. An apparatus for wireless communication at a network node comprising, comprising:

one or more processors, one or more memories coupled with the one or more processors; and instructions stored in the one or more memories and executable by the one or more processors to cause the apparatus to:

transmit to a user equipment (UE) a configuration message comprising an indication of one or more partial bands for channel state information reporting and an indication of one or more antenna ports for each partial band of the one or more partial bands, wherein each partial band of the one or more partial bands is less than a system bandwidth and comprises a plurality of frequency domain units, and wherein each frequency domain unit of the plurality of frequency domain units is associated with a precoder;

receive channel state information comprising an indication of the one or more antenna ports and linear combination coefficients for each partial band of the one or more partial bands based at least in part on transmitting the configuration message and channel state measurements; and communicate with the UE based at least in part on receiving the channel state information for each partial band of the one or more partial bands.

32. The apparatus of claim 31, wherein the indication of the one or more partial bands for channel state information reporting comprises one or more of a numerical quantity of partial bands for which the UE is to perform channel state measurement, or a partial band size for which the UE is to perform the channel state measurements, or a ratio of partial band size to frequency domain unit size.

33. The apparatus of claim 32, wherein the indication of the one or more partial bands is dependent on an indication of a numerical quantity of antenna ports to select for each partial band of the one or more partial bands or a numerical quantity of total antenna ports.

34. An apparatus for wireless communication at a user equipment (UE), comprising:

means for receiving, from a network node, a configuration message comprising an indication of one or more partial bands for channel state information reporting and an indication of one or more antenna ports for each partial band of the one or more partial bands, wherein each partial band of the one or more partial bands is less than a system bandwidth and comprises a plurality of frequency domain units, and wherein each frequency domain unit of the plurality of frequency domain units is associated with a precoder;

means for selecting, by the UE, one or more antenna ports for each partial band of the one or more partial bands based at least in part on the configuration message and the indication of the one or more antenna ports;

means for calculating channel state information comprising a linear combination of the selected one or more antenna ports for each partial band, based at least in part on receiving the configuration message; and means for transmitting the channel state information comprising at least an indication of the selected one or more antenna ports and linear combination coefficients for each partial band of the one or more partial bands in accordance with the indication of the one or more antenna ports.

35. The apparatus of claim 34, wherein the means for selecting the one or more antenna ports comprises:

means for selecting a subset of a total number of antenna ports for each partial band of the one or more partial bands in accordance with the indication of the one or more antenna ports.

* * * * *